(12) United States Patent
Yamanaka

(10) Patent No.: US 11,949,841 B2
(45) Date of Patent: Apr. 2, 2024

(54) IMAGE FORMING APPARATUS AND CONTROL PROGRAM THEREFOR

(71) Applicant: KONICA MINOLTA INC., Tokyo (JP)

(72) Inventor: Daiki Yamanaka, Sagamihara (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 18/115,662

(22) Filed: Feb. 28, 2023

(65) Prior Publication Data
US 2023/0336678 A1    Oct. 19, 2023

(30) Foreign Application Priority Data
Apr. 15, 2022   (JP) ................................ 2022-067648

(51) Int. Cl.
H04N 1/60    (2006.01)
H04N 1/00    (2006.01)
H04N 1/23    (2006.01)

(52) U.S. Cl.
CPC ....... H04N 1/6038 (2013.01); H04N 1/00034 (2013.01); H04N 1/2346 (2013.01)

(58) Field of Classification Search
CPC . H04N 1/6038; H04N 1/00034; H04N 1/2346
USPC .................................................. 358/1.9, 1.15
See application file for complete search history.

(56) References Cited

U.S. PATENT DOCUMENTS

2012/0154832 A1*  6/2012  Yokoyama ........... H04N 1/6033
                                                                358/1.9
2020/0007711 A1*  1/2020  Kamihara ............ H04N 1/4072

FOREIGN PATENT DOCUMENTS

JP            2013-218034 A    10/2013

* cited by examiner

Primary Examiner — Quang N Vo
(74) Attorney, Agent, or Firm — Squire Patton Boggs (US) LLP

(57) ABSTRACT

An image forming apparatus includes: an image former that forms a correction patch using toner; a measurer that measures a color, a density, or a deposited amount of toner of the correction patch; and a hardware processor that calculates a reference correction amount on the basis of a measurement value of the measurer so that the density of the correction patch reaches a target value, and corrects an image forming condition of the image former by a first correction amount smaller than the reference correction amount.

15 Claims, 18 Drawing Sheets

FIG. 13

| PATCH No. | DEVELOPMENT POTENTIAL Vc | REFERENCE CORRECTION AMOUNT ST | FIRST CORRECTION AMOUNT CA1 |
|---|---|---|---|
| 1 | -500V | -9.9V (=-1.98% OF Vc) | -3.3V (=-0.66% OF Vc) |
| 2 | -500V | -18.0V (=-3.60% OF Vc) | -6.0V (=-1.20% OF Vc) |
| 3 | -500V | -28.5V (=-5.70% OF Vc) | -9.5V (=-1.90% OF Vc) |
| 4 | -503.3V | -24.2V (=-4.80% OF Vc) | -8.1V (=-1.60% OF Vc) |
| 5 | -509.3V | -12.0V (=-2.35% OF Vc) | -4.0V (=-0.78% OF Vc) |
| 6 | -518.8V | 9.5V (=-1.83% OF Vc) | 3.2V (=-0.61% OF Vc) |
| 7 | -526.9V | 27.0V (=-5.13% OF Vc) | 9.0V (=-1.71% OF Vc) |

FIG. 15

| PATCH No. | DEVELOPMENT POTENTIAL Vc | REFERENCE CORRECTION AMOUNT ST | INCREASE RATE Z | FIRST CORRECTION AMOUNT CA1 |
|---|---|---|---|---|
| 1 | −500V | −9.9V (=1.98% OF Vc) | 1.2 | −4.0V (=0.8% OF Vc) |
| 2 | −500V | −18.0V (=3.60% OF Vc) | 1.1 | −6.6V (=1.32% OF Vc) |
| 3 | −500V | −28.5V (=5.70% OF Vc) | 1.0 | −9.5V (=1.90% OF Vc) |
| 4 | −504.0V | −24.2V (=4.80% OF Vc) | 1.0 | −8.1V (=1.60% OF Vc) |
| 5 | −510.6V | −12.0V (=2.35% OF Vc) | 1.0 | −4.0V (=0.78% OF Vc) |
| 6 | −520.1V | 9.5V (=−1.83% OF Vc) | 1.0 | 3.2V (=−0.61% OF Vc) |
| 7 | −528.2V | 27.0V (=−5.13% OF Vc) | 1.0 | 9.0V (=−1.71% OF Vc) |

FIG. 19

| PATCH No. | REFERENCE CORRECTION AMOUNT ST | INTRA-THRESHOLD CORRECTION AMOUNT Wc | SECOND CORRECTION AMOUNT CA2 | CURRENT EXTRA-THRESHOLD CORRECTION AMOUNT Uc | PREVIOUS EXTRA-THRESHOLD CORRECTION AMOUNT Up | THIRD CORRECTION AMOUNT CA3 | FIRST CORRECTION AMOUNT CA1 |
|---|---|---|---|---|---|---|---|
| 1 | 3.0V | 3.0V | 1.0V | 0V | 0V | 0V | 1.0V |
| 2 | 12.0V | 6.0V | 2.0V | 6.0V | 0V | 6.0V | 8.0V |
| 3 | 14.0V | 6.0V | 2.0V | 8.0V | 6.0V | 2.0V | 4.0V |

IMAGE FORMING APPARATUS AND CONTROL PROGRAM THEREFOR

The entire disclosure of Japanese patent Application No. 2022-067648, filed on Apr. 15, 2022, is incorporated herein by reference in its entirety.

BACKGROUND

Technological Field

The present disclosure relates to an image forming apparatus and a control program.

Description of the Related Art

In order to stabilize the color of printed matter during continuous printing, a technique of correcting, as color correction, an image forming condition (hereinafter also referred to as "image formation condition") of an image former on the basis of an amount of change in color on paper is known. For example, JP 2013-218034 A discloses an image forming apparatus that corrects an image formation condition in a stepwise manner.

In the image forming apparatus disclosed in JP 2013-218034 A, the image formation condition is corrected stepwise until a correction amount reaches a "target correction amount" detected from a patch image for adjustment. Therefore, the color can be prevented from being extremely changed, and the followability of correction to color variation is not impaired. However, since the image formation condition is finally corrected by the "target correction amount", overcorrection may occur due to an influence of density unevenness in the patch image for adjustment.

SUMMARY

An object of the present disclosure is to provide an image forming apparatus and a control program capable of suppressing overcorrection without impairing followability of correction to color variation.

To achieve the abovementioned object, according to an aspect of the present invention, an image forming apparatus reflecting one aspect of the present invention comprises: an image former that forms a correction patch using toner; a measurer that measures a color, a density, or a deposited amount of toner of the correction patch; and a hardware processor that calculates a reference correction amount on the basis of a measurement value of the measurer so that the density of the correction patch reaches a target value, and corrects an image forming condition of the image former by a first correction amount smaller than the reference correction amount.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 13 is a diagram illustrating an example of a change in development potential according to the first embodiment;

FIG. 15 is a diagram illustrating an example of a first correction amount according to a second embodiment;

FIG. 19 is a diagram illustrating an example of various correction amounts illustrated in FIG. 18.

DETAILED DESCRIPTION OF EMBODIMENTS

Figure 1:
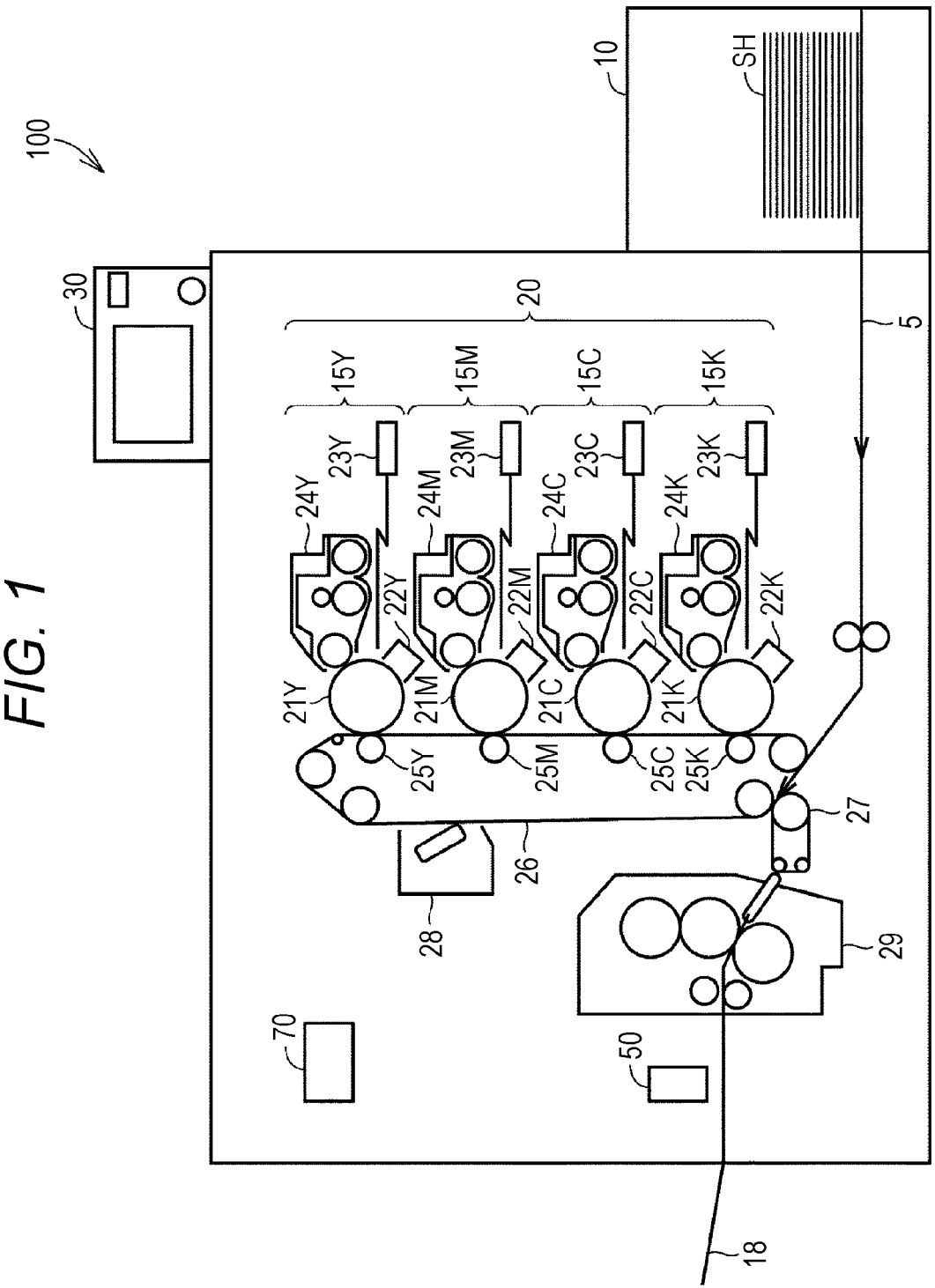
FIG. 1 is a diagram schematically illustrating an image forming apparatus according to a first embodiment.

Hereinafter, one or more embodiments and modifications of the present invention will be described with reference to the drawings. However, the scope of the invention is not limited to the disclosed embodiments. In the following description, the same parts and components are denoted by the same reference numerals. They also have the same names and the same functions. Hence, they are not repeatedly described in detail. Note that the embodiments and modifications described below may be selectively combined as appropriate.

First Embodiment

A. Overview of Image Forming Apparatus

The schematic configuration of an image forming apparatus according to the first embodiment will be described with reference to FIGS. 1 to 3.

FIG. 1 is a diagram schematically illustrating the image forming apparatus according to the first embodiment. Referring to FIG. 1, an image forming apparatus 100 according to the first embodiment includes a sheet feeder 10, an image former 20, an operation panel 30, a measurer 50, and a processor 70.

The sheet feeder 10 feeds stored sheets SH one by one to a conveyance path 5. The image former 20 forms an image on the sheet SH using toner. The image includes at least one of a user-designated image designated by a user, a correction patch, and a target-value calculation patch. The correction patch and the target-value calculation patch, which will be described in detail below, are gradation patches for each color. The operation panel 30 is a touch panel in which an input device and a display device are integrated. The operation panel 30 receives various types of setting information of the image forming apparatus 100 and notifies various types of information.

The measurer 50 is a reflective optical sensor incorporating a light emitting element such as a light emitting diode and a light receiving element such as a photodiode. During a target-value calculation period, the measurer 50 measures the density of the target-value calculation patch formed on the sheet SH, and outputs the measurement result to the processor 70. The processor 70 sets a target value in color correction on the basis of the measurement result of the measurer 50. In addition, during a color correction period after the end of the target-value calculation period, the measurer 50 measures the density of the correction patch formed on the sheet SH, and outputs the measurement result to the processor 70. The processor 70 corrects the image forming condition of the image former 20 on the basis of the measurement result of the measurer 50. In the following description, correcting the image forming condition of the image former is also referred to as "applying correction" or "applying a correction amount".

Note that the measurer 50 may measure the color of the correction patch or the target-value calculation patch formed on the sheet SH. The measurer 50 may measure an amount of toner deposited on the correction patch or the target-value calculation patch formed on the sheet SH. In the following description, the measurer 50 is supposed to measure the density of the correction patch or the target-value calculation patch formed on the sheet SH.

The image former 20 includes an image forming unit 15Y that forms a yellow toner image, an image forming unit 15M that forms a magenta toner image, an image forming unit 15C that forms a cyan toner image, an image forming unit 15K that forms a key plate toner image, a secondary transfer device 27, a cleaning device 28, and a fixing device 29. In the following description, the image forming unit 15Y, the image forming unit 15M, the image forming unit 15C, and the image forming unit 15K will be referred to as "image forming unit 15" when they are not distinguished from one another.

The image forming unit 15Y includes a photoreceptor 21Y, a charging device 22Y, an exposure device 23Y, a developing device 24Y, and a primary transfer device 25Y. The image forming unit 15M includes a photoreceptor 21M, a charging device 22M, an exposure device 23M, a developing device 24M, and a primary transfer device 25M. The image forming unit 15C includes a photoreceptor 21C, a charging device 22C, an exposure device 23C, a developing device 24C, and a primary transfer device 25C. The image forming unit 15K includes a photoreceptor 21K, a charging device 22K, an exposure device 23K, a developing device 24K, and a primary transfer device 25K.

In the following description, the photoreceptor 21Y, the photoreceptor 21M, the photoreceptor 21C, and the photoreceptor 21K will be referred to as "photoreceptor 21" when they are not distinguished from one another. In the following description, the charging device 22Y, the charging device 22M, the charging device 22C, and the charging device 22K will be referred to as "charging device 22" when they are not distinguished from one another. In the following description, the exposure device 23Y, the exposure device 23M, the exposure device 23C, and the exposure device 23K will be referred to as "exposure device 23" when they are not distinguished from one another. In the following description, the developing device 24Y, the developing device 24M, the developing device 24C, and the developing device 24K will be referred to as "developing device 24" when they are not distinguished from one another. In the following description, the primary transfer device 25Y, the primary transfer device 25M, the primary transfer device 25C, and the primary transfer device 25K will be referred to as "primary transfer device 25" when they are not distinguished from one another.

The image forming apparatus 100 forms an image as follows. First, the charging device 22 imparts a negative charge to the entire photoreceptor 21. Next, the exposure device 23 irradiates the negatively charged photoreceptor 21 with a laser beam based on printing data. The printing data includes image data of a user-designated image and image data of a correction patch. A positive charge is generated at a place irradiated with the laser beam, and the negative charge disappears. Therefore, a latent image of printing data is formed on the photoreceptor 21. Next, the developing device 24 supplies negatively charged toner to the photoreceptor 21. As a result, the toner adheres to a place on the photoreceptor 21 where no negative charge is applied, and the latent image is visualized. That is, a toner image based on the printing data is formed on the photoreceptor 21.

Next, the primary transfer device 25 transfers the toner image formed on the photoreceptor 21 to an intermediate transfer belt 26. The intermediate transfer belt 26 rotates, so that the toner images of the respective colors are superimposed on the intermediate transfer belt 26. As a result, the toner image based on the printing data is formed on the intermediate transfer belt 26.

The secondary transfer device 27 transfers the toner images of the respective colors superimposed on the intermediate transfer belt 26 onto the sheet SH. The cleaning device 28 collects the toner remaining on the intermediate transfer belt 26 without being transferred to the sheet SH. The fixing device 29 applies heat and pressure to the sheet SH onto which the toner image has been transferred to fix the toner image on the sheet SH. As a result, image formation on the sheet SH is completed, and thereafter, the sheet SH is ejected to a sheet ejection tray 18.

Note that the image forming apparatus 100 is not limited to a color machine. The image forming apparatus 100 may be a monochrome machine.

Figure 2:
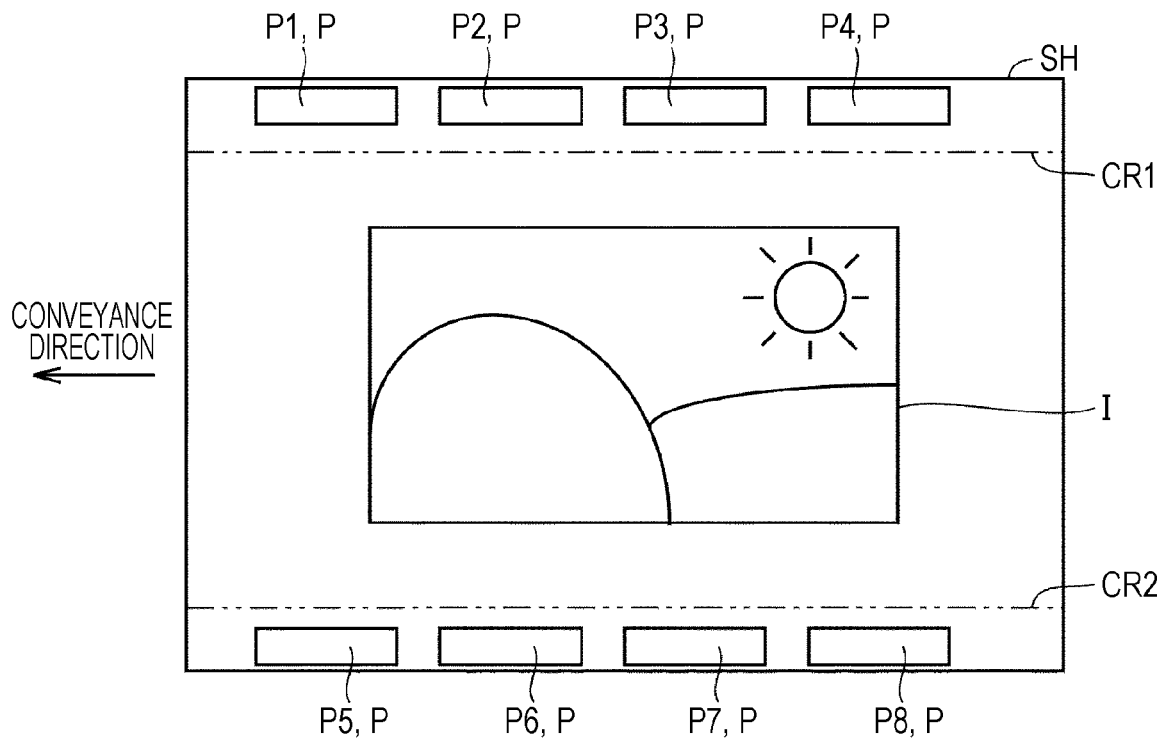
FIG. 2 is a diagram for describing a correction patch in the first embodiment.

FIG. 2 is a diagram for describing the correction patch in the first embodiment. The correction patch P is a gradation patch for each color used for color correction of yellow, magenta, cyan, and the key plate.

The correction patch P1 is a yellow gradation patch. The correction patch P2 is a magenta gradation patch. The correction patch P3 is a red gradation patch. The correction patch P4 is a green gradation patch. The correction patch P5 is a cyan gradation patch. The correction patch P6 is a black gradation patch. The correction patch P7 is a blue gradation patch. The correction patch P8 is a gradation patch of a process ink (Process Bk).

In the following description, the correction patch P1, the correction patch P2, the correction patch P3, the correction patch P4, the correction patch P5, the correction patch P6, the correction patch P7, and the correction patch P8 will be referred to as "correction patch P" when they are not distinguished from one another. In the example illustrated in FIG. 2, all the correction patches P used for color correction of yellow, magenta, cyan, and key plate are formed on one sheet SH.

The sheet SH is conveyed in a direction of an arrow in FIG. 2. The sheet SH is finally cut along cutting lines CR1 and CR2. The correction patch P is formed in a region to be finally discarded in the sheet SH on which the user-designated image I is formed, that is, in a region outside the cutting lines CR1 and CR2.

The correction patch P is repeatedly formed during continuous printing. For example, the correction patch P may be formed on all the sheets SH during continuous printing, or may be formed every few sheets SH during continuous printing.

The correction patch P may be formed on a sheet different from the sheet SH on which the user-designated image I is formed. Further, when all the correction patches P cannot be put into one sheet SH, the correction patches P that cannot be put may be formed on the next sheet SH.

Figure 3:
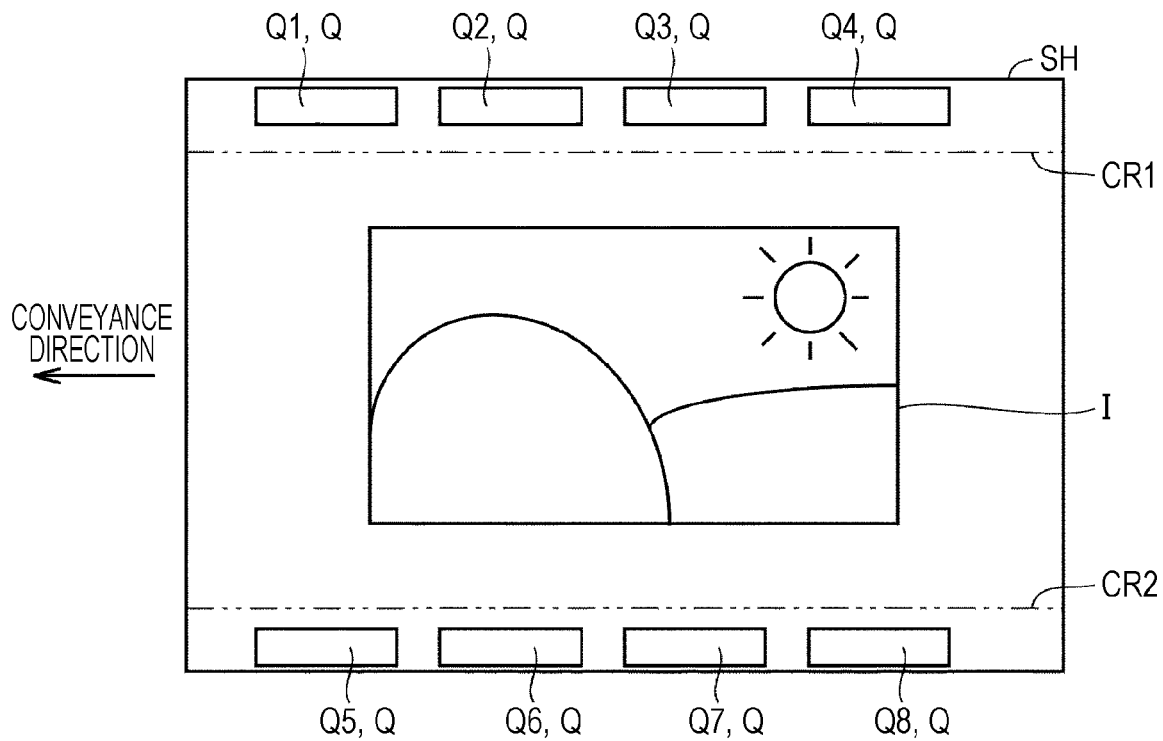
FIG. 3 is a diagram for describing a target-value calculation patch in the first embodiment.

FIG. 3 is a diagram for describing the target-value calculation patch in the first embodiment. The target-value calculation patch Q is a gradation patch for each color used for calculation of a target value in color correction.

The target-value calculation patch Q1 is a yellow gradation patch. The target-value calculation patch Q2 is a magenta gradation patch. The target-value calculation patch Q3 is a red gradation patch. The target-value calculation patch Q4 is a green gradation patch. The target-value calculation patch Q5 is a cyan gradation patch. The target-value calculation patch Q6 is a black gradation patch. The target-value calculation patch Q7 is a blue gradation patch. The target-value calculation patch Q8 is a process ink gradation patch.

In the following description, the target-value calculation patch Q1, the target-value calculation patch Q2, the target-value calculation patch Q3, the target-value calculation patch Q4, the target-value calculation patch Q5, the target-value calculation patch Q6, the target-value calculation patch Q7, and the target-value calculation patch Q8 will be referred to as "target-value calculation patch Q" when they are not distinguished from one another. In the example illustrated in FIG. 3, all the target-value calculation patches Q used for calculating a target value for color correction of yellow, magenta, cyan, and key plate are formed on one sheet SH.

The sheet SH is conveyed in a direction of an arrow in FIG. 3. The sheet SH is finally cut along the cutting lines CR1 and CR2. The target-value calculation patch Q is formed in a region to be finally discarded in the sheet SH on which the user-designated image I is formed, that is, in a region outside the cutting lines CR1 and CR2.

The target-value calculation patch Q is formed a plurality of times by the image former 20 in an initial stage of continuous printing. For example, the target-value calculation patch Q may be formed on all the sheets SH in the initial stage of continuous printing, or may be formed every few sheets SH in the initial stage of continuous printing.

The target-value calculation patch Q may be formed on a sheet different from the sheet SH on which the user-designated image I is formed. Further, when all the target-value calculation patches Q cannot be put into one sheet SH, the target-value calculation patches Q that cannot be put may be formed on the next sheet SH.

The size of the target-value calculation patch Q may be the same as or larger than the size of the correction patch P. When the size of the target-value calculation patch Q is larger than the size of the correction patch P, an influence of density unevenness of the target-value calculation patch Q can be suppressed, and thus the accuracy of the target value is increased.

In the present embodiment, the target-value calculation patch Q is formed three times in the initial stage of continuous printing, and the target value for the color correction is set on the basis of the densities of the first to third target-value calculation patches Q.

B. Hardware Configuration Example of Image Forming Apparatus 100

Figure 4:
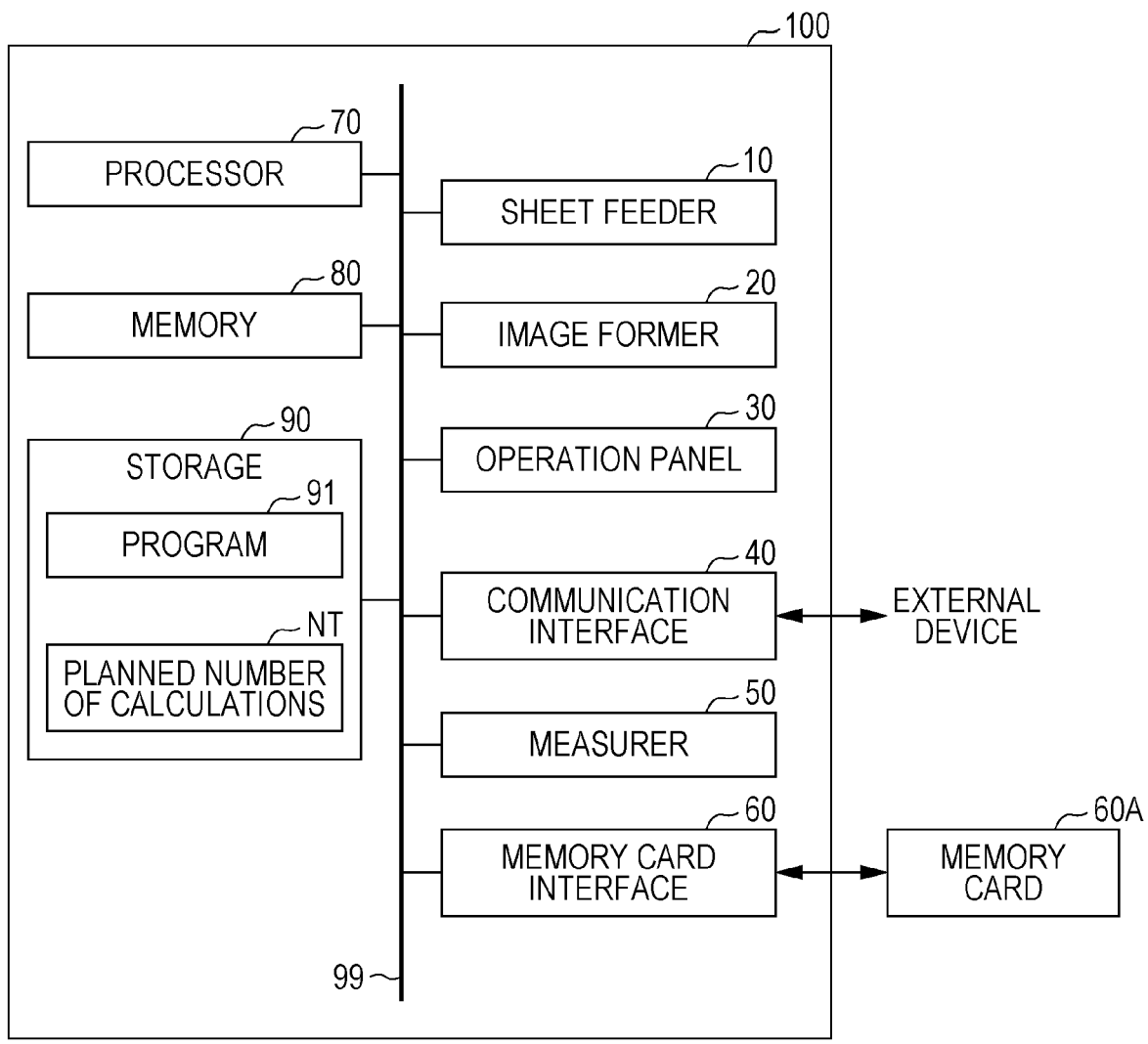
FIG. 4 is a diagram illustrating an example of a hardware configuration of the image forming apparatus according to the first embodiment.

FIG. 4 is a diagram illustrating an example of a hardware configuration of the image forming apparatus according to the first embodiment. The image forming apparatus 100 further includes a communication interface 40, a memory card interface 60, a memory 80, and a storage 90 in addition to the sheet feeder 10, the image former 20, the operation panel 30, the measurer 50, and the processor 70 described above. The sheet feeder 10, the image former 20, the operation panel 30, the communication interface 40, the measurer 50, the memory card interface 60, the processor 70, the memory 80, and the storage 90 are electrically connected via a bus 99.

The communication interface 40 is in charge of data exchange between the image forming apparatus 100 and an external device. The external device is, for example, a terminal device used by a user. As an example, the communication interface 40 receives image data of the user-designated image I from the external device.

The processor 70 includes, for example, a central processing unit (CPU), a micro-processing unit (MPU), or the like. The memory 80 includes, for example, a volatile storage device such as a dynamic random access memory (DRAM) or a static random access memory (SRAM). The storage 90 includes, for example, a non-volatile storage device such as a solid state drive (SSD) or a flash memory. The storage 90 stores a program 91. The program 91 includes computer-readable instructions for controlling the image forming apparatus 100. The program 91 includes a "control program" in the present disclosure. The processor 70 implements various processes according to the present embodiment by loading the program 91 stored in the storage 90 in the memory 80 and executing the program.

The storage 90 further stores the planned number of calculations NT. The planned number of calculations NT will be described later.

The program 91 is provided by being stored in a storage medium such as a memory card 60A. The program 91 is read from the memory card 60A by the memory card interface 60 and installed in the image forming apparatus 100.

The program 91 may be provided not as an individual program but by being incorporated in a part of any program. In this case, the processing according to the present embodiment is implemented in cooperation with any program. Even such a program not including some modules does not depart from the gist of the image forming apparatus 100 according to the present embodiment. In addition, some or all of the functions provided by the program 91 may be achieved by dedicated hardware.

In place of the mode in which the program 91 stored in the memory card 60A is installed in the image forming apparatus 100, a program downloaded from a distribution server or the like may be installed in the image forming apparatus 100.

C. Problem of Color Correction

A problem of color correction will be described with reference to FIGS. 5 to 8.

Figure 5:
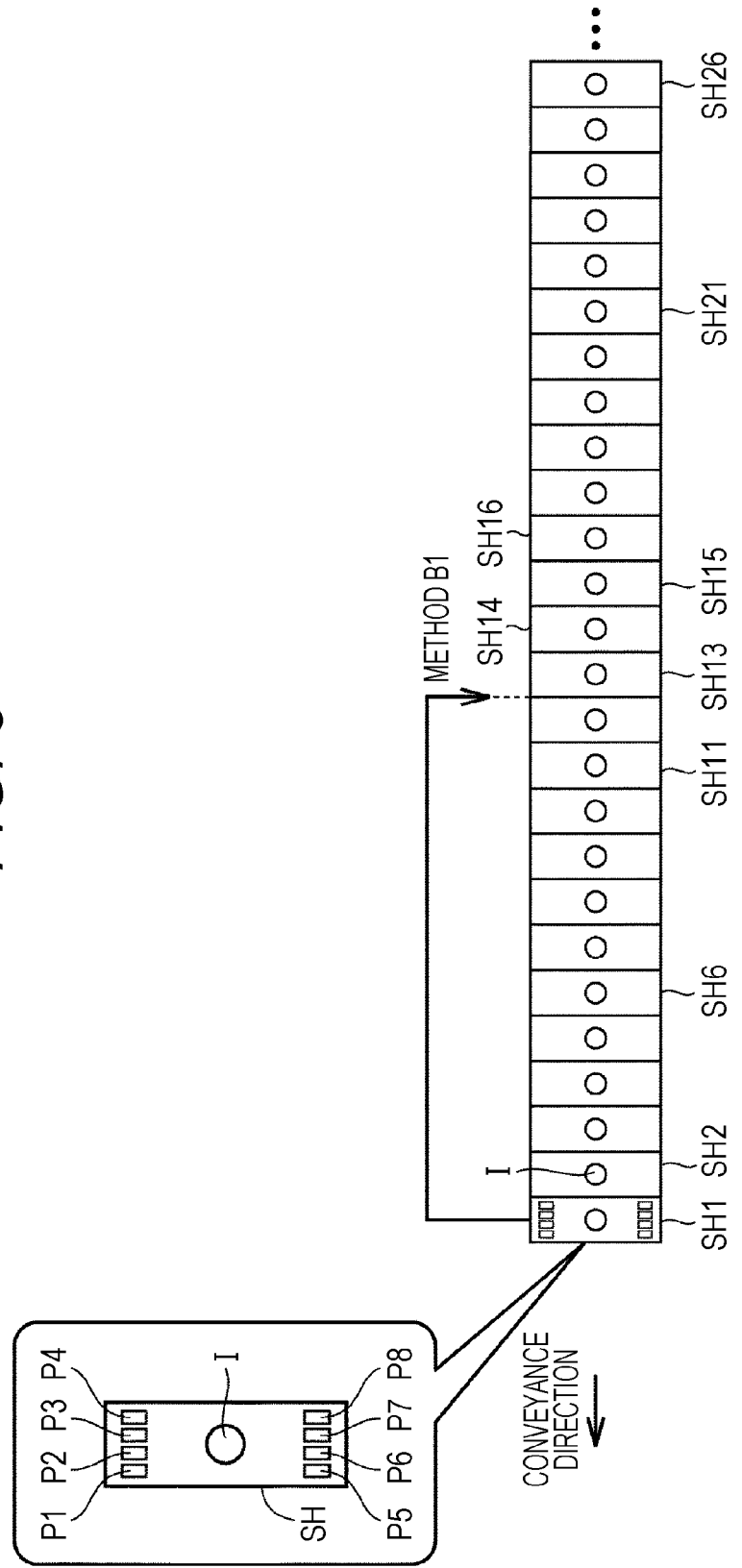
FIG. 5 is a diagram illustrating a method for color correction.

FIG. 5 is a diagram illustrating a method B1 for color correction. The method B1 is an example of a color correction method to be compared with the color correction method performed by the image forming apparatus 100 according to the first embodiment.

A sheet SHn (n is an integer of 1 or more) indicates the nth sheet during continuous printing. In the following description, when the sheet SHn is not distinguished, the sheet SHn is referred to as "sheet SH". The sheet SH is conveyed in a direction of an arrow in FIG. 5.

In the example illustrated in FIG. 5, the correction patch P and the user-designated image I are formed on the 1st sheet SH1. In the example illustrated in FIG. 5, only the user-designated image I is formed on the 2nd to 26th sheets SH. In FIG. 5, the correction patch P formed on the 1st sheet SH1 is referred to as a "first correction patch P".

In the method B1, the correction amount is calculated on the basis of the density of the first correction patch P, and the image forming condition of the image former is corrected by the calculated correction amount. Specifically, the correction amount is calculated so that the measured density of the first correction patch P reaches a target value.

As an example, when the first correction patch P is formed, first, the density of the correction patch P is measured. Next, the correction amount is calculated so that the density of the correction patch P reaches the target value. Next, the image forming condition of the image former is corrected by the correction amount.

In the example illustrated in FIG. 5, at the timing at which image formation on the 12th sheet (sheet SH13 in FIG. 5) after the formation of the first correction patch P is started, the correction is applied for the first time after the formation of the first correction patch P. That is, in the example illustrated in FIG. 5, an image is formed on the 12th sheet and the subsequent sheets after the formation of the first correction patch P under the image forming condition corrected by the correction amount calculated on the basis of the first correction patch P. Even in a case where the technology described in JP 2013-218034 A is applied, after the formation of the first correction patch P, the image forming condition is corrected stepwise at the timing of image formation on the 12th sheet to the 14th sheet (sheet SH13, sheet SH14, and sheet SH15 in FIG. 5), and an image is formed on the 15th sheet (sheet SH16 in FIG. 5) under the image forming condition corrected by the correction amount calculated on the basis of the first correction patch P, for example.

Figure 6:
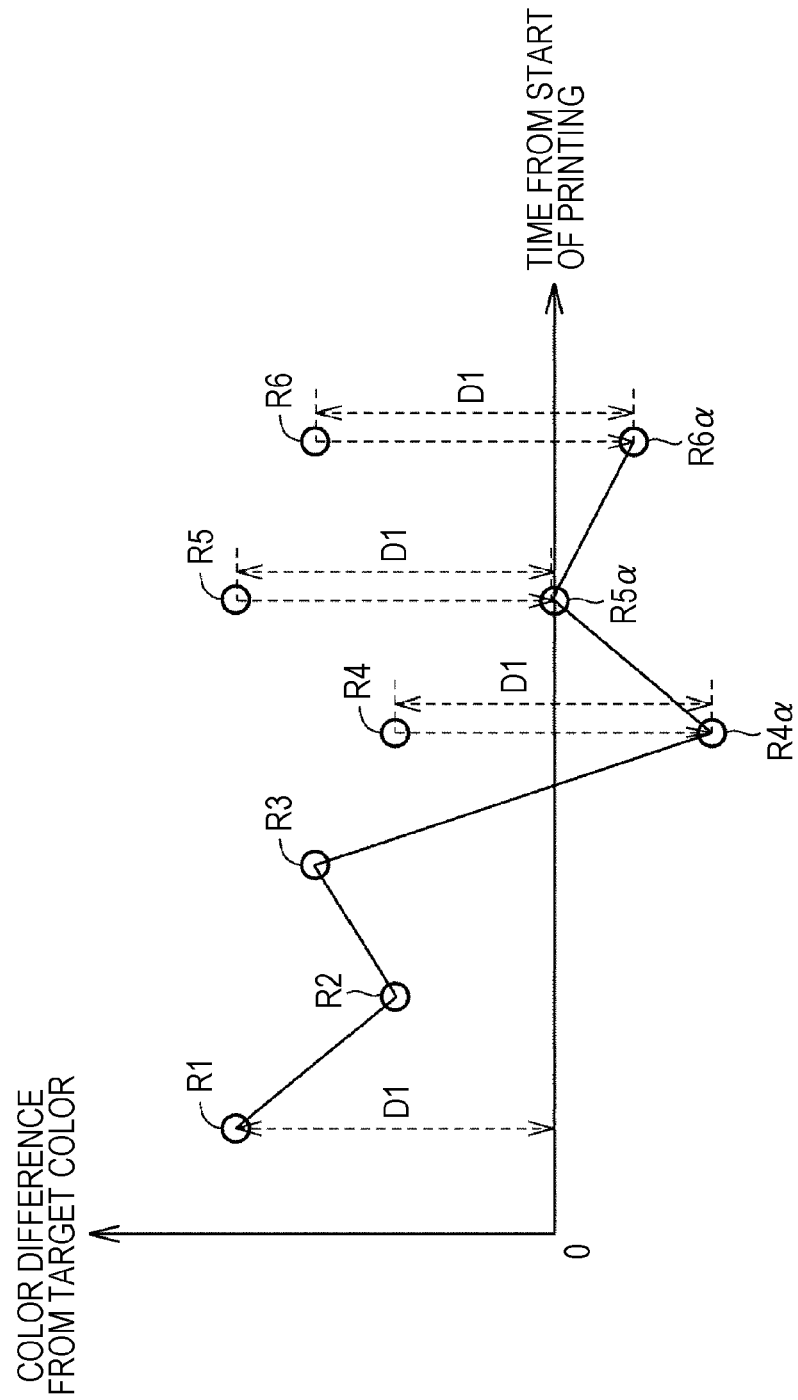
FIG. 6 is a diagram illustrating a change in color in a case where color correction with the method is performed.

A change in color when color correction with the method B1 is performed will be described with reference to FIG. 6. FIG. 6 is a diagram illustrating a change in color in a case where color correction with the method B1 is performed.

A color R1 indicates a color at the time of formation of the first correction patch P. A color R2 indicates a color at the time of image formation on the fifth sheet (sheet SH6 illustrated in FIG. 5) after the first correction patch P is formed. A color R3 indicates a color at the time of image formation on the 10th sheet (sheet SH11 illustrated in FIG. 5) after the first correction patch P is formed. A color R4 indicates a color at the time of image formation on the 15th sheet (sheet SH16 illustrated in FIG. 5) after the first correction patch P is formed in a case where color correction is not performed. A color R5 indicates a color at the time of image formation on the 20th sheet (sheet SH21 illustrated in FIG. 5) after the first correction patch P is formed in a case where color correction is not performed. A color R6 indicates a color at the time of image formation on the 25th sheet (sheet SH26 illustrated in FIG. 5) after the first correction patch P is formed in a case where color correction is not performed.

A color R4α indicates a color at the time of image formation on the 15th sheet (sheet SH16 illustrated in FIG. 5) after the first correction patch P is formed in a case where color correction with the method B1 is performed. A color R5α indicates a color at the time of image formation on the 20th sheet (sheet SH21 illustrated in FIG. 5) after the first correction patch P is formed in a case where color correction with the method B1 is performed. A color R6α indicates a color at the time of image formation on the 25th sheet (sheet SH26 illustrated in FIG. 5) after the first correction patch P is formed in a case where color correction with the method B1 is performed.

As described above, an image is formed on the 12th sheet and the subsequent sheets after the formation of the first correction patch P under the image forming condition corrected by the correction amount calculated on the basis of the first correction patch P. Therefore, the color at the time of image formation on the 15th sheet after the formation of the first correction patch P is the color R4α, the color at the time of image formation on the 20th sheet after the formation of the first correction patch P is the color R5α, and the color at the time of image formation on the 25th sheet after the formation of the first correction patch P is the color R6α. The color R4α is a color obtained by correcting the color R4 by a color difference D1. The color R5α is a color obtained by correcting the color R5 by the color difference D1. The color R6α is a color obtained by correcting the color R6 by the color difference D1. The color difference D1 is the color difference between the color R1 at the time of formation of the first correction patch P and a target color.

In the example illustrated in FIG. 6, the color R4α and the color R6α after the correction are greatly deviated from the target color, which means overcorrection occurs. The reason why the overcorrection occurs is that the density of the correction patch P varies at each time. On the other hand, since the correction is applied at the time of image formation on the 15th sheet after the first correction patch P is formed, the time from the formation of the first correction patch P to the application of the correction is shorter than that in a later-described method B2. As described above, the method B1 with which the correction amount is calculated so that the density of the correction patch P reaches the target value on the basis of the density of one correction patch P provides good followability of the correction to color variation, but may cause overcorrection by the influence of density unevenness of the correction patch P.

Figure 7:
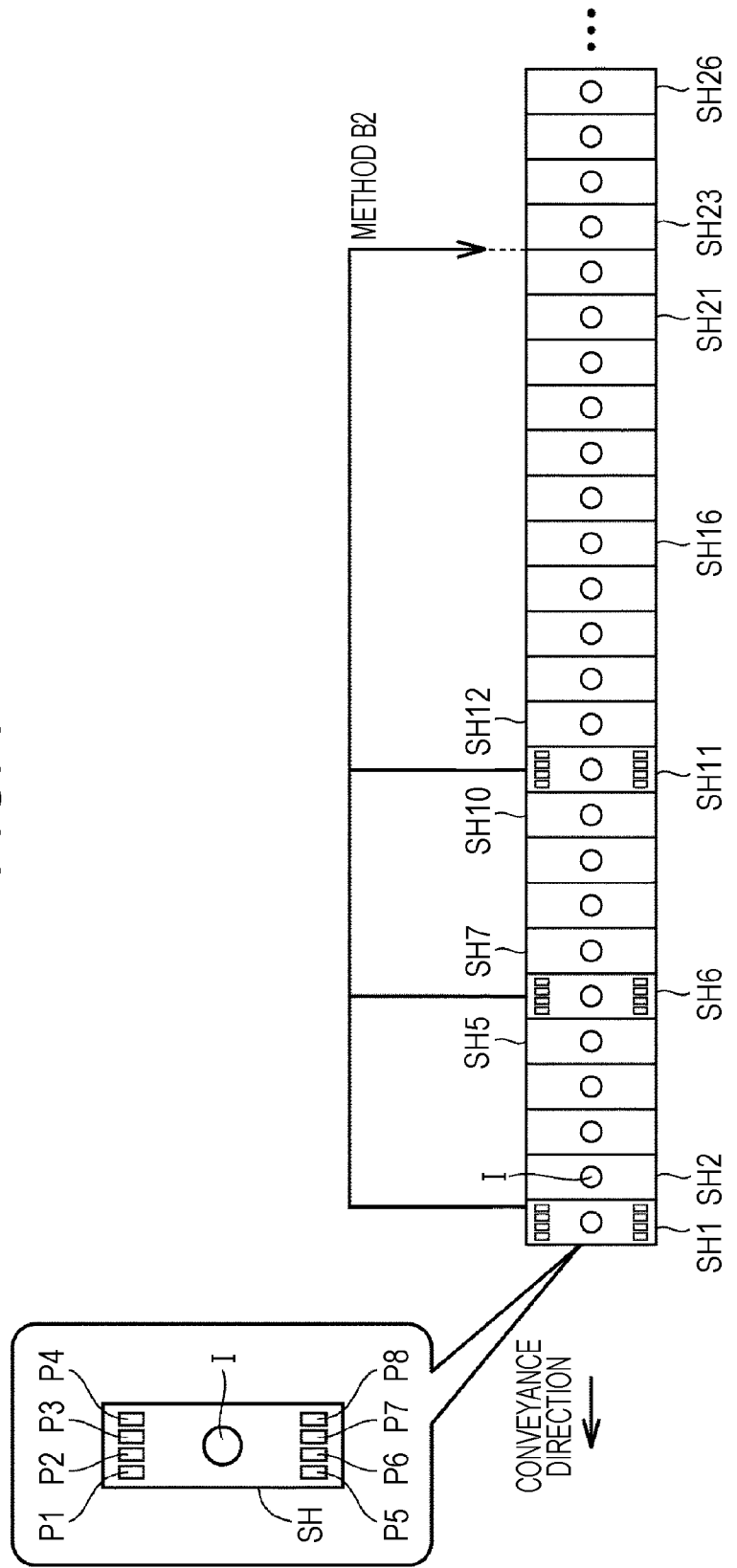
FIG. 7 is a diagram illustrating a method for color correction.

FIG. 7 is a diagram illustrating a method B2 for color correction. The method B2 is another example of a color correction method to be compared with the color correction method performed by the image forming apparatus 100 according to the first embodiment.

A sheet SHn (n is an integer of 1 or more) indicates the nth sheet during continuous printing. As described above, when the sheet SHn is not distinguished, the sheet SHn is referred to as "sheet SH". The sheet SH is conveyed in a direction of an arrow in FIG. 7.

In the example illustrated in FIG. 7, the correction patch P and the user-designated image I are formed on the 1st sheet SH1, the 6th sheet SH6, and the 11th sheet SH11. Further, in the example illustrated in FIG. 7, only the user-designated image I is formed on the 2nd to 5th sheets SH, the 7th to 10th sheets SH, and the 12th to 26th sheets SH. In FIG. 7, the correction patch P formed on the 1st sheet SH1 is referred to as a "first correction patch P", the correction patch P formed on the 6th sheet SH6 is referred to as a "second correction patch P", and the correction patch P formed on the 11th sheet SH11 is referred to as a "third correction patch P".

In the method B2, the correction amount is calculated on the basis of the densities of the three correction patches P, and the image forming condition of the image former is corrected by the calculated correction amount. Specifically, the correction amount is calculated so that the average of the measured densities of the three correction patches P reaches a target value.

As an example, when the first correction patch P is formed, first, the density of the first correction patch P is measured. Next, when the second correction patch P is formed, the density of the second correction patch P is measured. Next, when the third correction patch P is formed, the density of the third correction patch P is measured. Next, the correction amount is calculated so that the average of the measured densities of the three correction patches P reaches the target value, and the image forming condition of the image former is corrected by the correction amount.

In the example illustrated in FIG. 7, at the timing at which image formation on the 22nd sheet (sheet SH23 in FIG. 7) after the formation of the first correction patch P is started, the correction is applied for the first time after the formation of the first correction patch P. That is, in the example illustrated in FIG. 7, an image is formed on the 22nd sheet and the subsequent sheets after the formation of the first correction patch P under the image forming condition corrected by the correction amount calculated on the basis of the first to third correction patches P.

Figure 8:
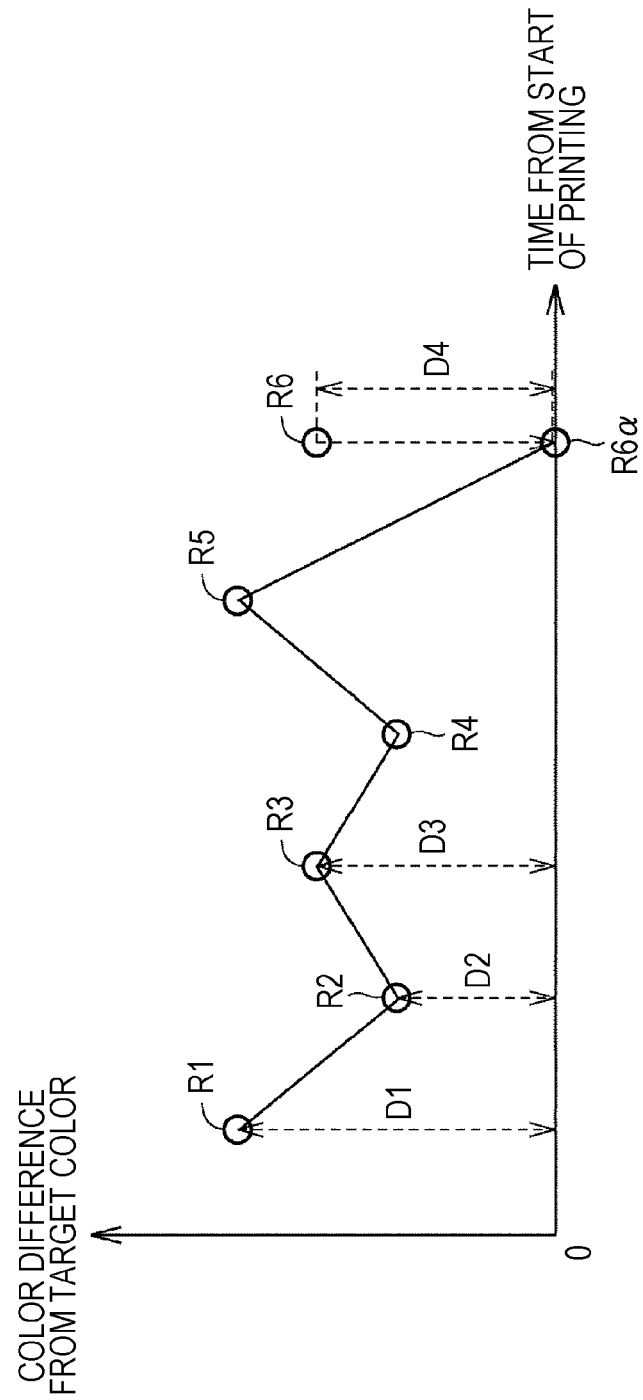
FIG. 8 is a diagram illustrating a change in color in a case where color correction with the method is performed.

A change in color when color correction with the method B2 is performed will be described with reference to FIG. 8. FIG. 8 is a diagram illustrating a change in color in a case where color correction with the method B2 is performed.

A color R1 indicates a color at the time of formation of the first correction patch P. A color R2 indicates a color at the time of image formation on the fifth sheet (sheet SH6 illustrated in FIG. 7) after the first correction patch P is formed. That is, the color R2 indicates the color at the time of formation of the second correction patch P. A color R3 indicates a color at the time of image formation on the 10th sheet (sheet SH11 illustrated in FIG. 7) after the first correction patch P is formed. That is, the color R3 indicates the color at the time of formation of the third correction patch P. A color R4 indicates a color at the time of image formation on the 15th sheet (sheet SH16 illustrated in FIG. 7) after the first correction patch P is formed. A color R5 indicates a color at the time of image formation on the 20th sheet (sheet SH21 illustrated in FIG. 7) after the first correction patch P is formed.

A color R6 indicates a color at the time of image formation on the 25th sheet (sheet SH26 illustrated in FIG. 7) after the first correction patch P is formed in a case where color correction is not performed. A color R6α indicates a color at the time of image formation on the 25th sheet (sheet SH26 illustrated in FIG. 7) after the first correction patch P is formed in a case where color correction with the method B2 is performed.

As described above, an image is formed on the 22nd sheet and the subsequent sheets after the formation of the first correction patch P under the image forming condition corrected by the correction amount calculated on the basis of the first to third correction patches P. Therefore, the color at the time of image formation on the 25th sheet after the formation of the first correction patch P is the color R6α. The color R6α is a color obtained by correcting the color R6 by a color difference D4. The color difference D4 is an average value of a color difference D1 between the color R1 at the time of formation of the first correction patch P and the target color, a color difference D2 between the color R2 at the time of formation of the second correction patch P and the target color, and a color difference D3 between the color R3 at the time of formation of the third correction patch P and the target color.

As illustrated in FIG. 8, the corrected color R6α is the target color, and thus, overcorrection does not occur. On the other hand, since the correction is not yet applied at the time of image formation on the 15th sheet after the formation of the first correction patch P, the time from the formation of the first correction patch P to the application of the correction is longer than that in the method B 1. As described above, the method B2 in which the correction amount is calculated on the basis of the densities of the three correction patches P can suppress overcorrection but deteriorates the followability of the correction to color variation.

As described above, the color correction methods (method B1, method B2) compared with the color correction method performed by the image forming apparatus 100 according to the first embodiment have difficulty in achieving both ensuring of followability of correction to color variation and suppression of overcorrection. That is, suppressing overcorrection without impairing followability of correction to color variation is a problem in color correction.

D. Color Correction by Image Forming Apparatus 100

Color correction by the image forming apparatus 100 according to the first embodiment will be described with reference to FIGS. 9 to 14.

(d1: Color Correction Method)

Figure 9:
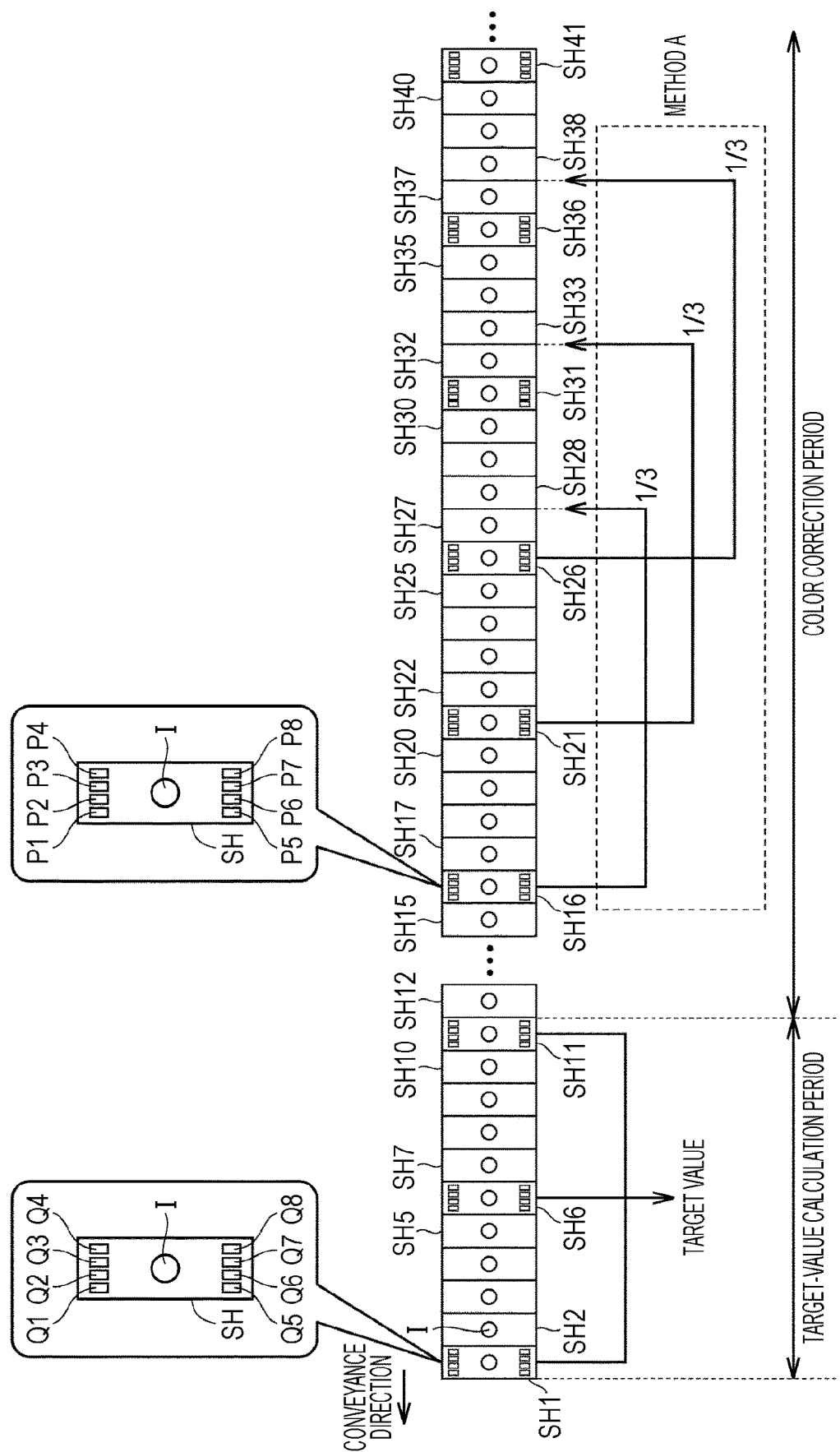
FIG. 9 is a diagram for describing a color correction method by the image forming apparatus according to the first embodiment.

FIG. 9 is a diagram for describing a color correction method by the image forming apparatus according to the first embodiment. In the following description, the color correction method by the image forming apparatus 100 is referred to as a "method A".

Referring to FIG. 9, a sheet SHn (n is an integer of 1 or more) indicates the nth sheet during continuous printing. As described above, when the sheet SHn is not distinguished, the sheet SHn is referred to as "sheet SH". The sheet SH is conveyed in a direction of an arrow in FIG. 9.

In the example illustrated in FIG. 9, a target-value calculation patch Q and a user-designated image I are formed on the 1st sheet SH1, the 6th sheet SH6, and the 11th sheet SH11. A correction patch P and the user-designated image I are formed on the 16th sheet SH16, the 21st sheet SH21, the 26th sheet SH26, the 31st sheet SH31, the 36th sheet SH36, and the 41st sheet SH41. In addition, only the user-designated image I is formed on the 2nd to 5th sheets SH, the 7th to 10th sheets SH, the 12th to 15th sheets SH, the 17th to 20th sheets SH, the 22nd to 25th sheets SH, the 27th to 30th sheets SH, the 32nd to 35th sheets SH, and the 37th to 40th sheets SH.

In the present embodiment, the target-value calculation patch Q formed on the 1st sheet SH1 is referred to as a "first target-value calculation patch Q", the target-value calculation patch Q formed on the 6th sheet SH6 is referred to as a "second target-value calculation patch Q", and the target-value calculation patch Q formed on the 11th sheet SH11 is referred to as a "third target-value calculation patch Q".

In the present embodiment, the correction patch P formed on the 16th sheet SH16 is referred to as a "first correction patch P", the correction patch P formed on the 21st sheet SH21 is referred to as a "second correction patch P", the correction patch P formed on the 26th sheet SH26 is referred to as a "third correction patch P", the correction patch P formed on the 31st sheet SH31 is referred to as a "fourth correction patch P", the correction patch P formed on the 36th sheet SH36 is referred to as a "fifth correction patch P", and the correction patch P formed on the 41st sheet SH41 is referred to as a "sixth correction patch P".

In the present embodiment, the target-value calculation patch Q is formed three times during a target-value calculation period. During the target-value calculation period, the densities of the first to third target-value calculation patches Q are measured by the measurer 50, and a representative value of the densities of the first to third target-value calculation patches Q are set as the target value. The representative value may be an average value or a median value.

In the present embodiment, color correction is performed by the method A based on the target value set during the target-value calculation period and the density of the correction patch P formed during the color correction period. Specifically, in the method A, a reference correction amount is calculated so that the density of the correction patch P reaches the target value every time the correction patch P is formed, and the image forming condition of the image former 20 is corrected by a first correction amount smaller than the reference correction amount. The target value is a representative value of the densities of the first to third target-value calculation patches Q. The first correction amount is a value obtained by dividing the reference correction amount by the planned number of calculations NT (see FIG. 4).

The planned number of calculations NT is the number of times the reference correction amount is planned to be calculated during the period from the formation of the correction patch P to the correction of the image forming condition. In the example illustrated in FIG. 9, the reference correction amount calculated during the period from the formation of the first correction patch P to the correction of the image forming condition is the reference correction amount calculated on the basis of the first correction patch P, the reference correction amount calculated on the basis of the second correction patch P, and the reference correction amount calculated on the basis of the third correction patch P. Therefore, in the example illustrated in FIG. 9, the planned number of calculations is three. In the example illustrated in FIG. 9, the image forming condition of the image former 20 is corrected by an amount $\frac{1}{3}$ of the reference correction amount calculated on the basis of each of the correction patches P.

As an example, when the first correction patch P is formed, the first correction amount is determined, and the image forming condition of the image former 20 is corrected by the first correction amount. Specifically, when the first correction patch P is formed, first, the density of the first correction patch P is measured. Next, the reference correction amount is calculated so that the density of the correction patch P reaches a target value. Next, an amount $\frac{1}{3}$ of the reference correction amount is determined as the first correction amount. Next, the image forming condition of the image former 20 is corrected by the first correction amount. In the example illustrated in FIG. 9, the first correction amount calculated on the basis of the first correction patch P is applied at the timing at which image formation on the 12th sheet (sheet SH28 in FIG. 9) after the formation of the first correction patch P is started. Therefore, an image is formed on the 15th sheet (sheet SH31 in FIG. 9) after the formation of the first correction patch P under the image forming condition corrected by the first correction amount calculated on the basis of the first correction patch P from the image forming condition at the time of forming the first correction patch P.

When the second correction patch P is formed, the first correction amount is again determined, and the image forming condition of the image former 20 is corrected by the first correction amount. Specifically, when the second correction patch P is formed, first, the density of the second correction patch P is measured. Next, the reference correction amount is calculated so that the density of the correction patch P reaches the target value. Next, an amount $\frac{1}{3}$ of the reference correction amount is determined as the first correction amount. Next, the image forming condition of the image former 20 is corrected by the first correction amount. In the example illustrated in FIG. 9, the first correction amount calculated on the basis of the second correction patch P is applied at the timing at which image formation on the 17th sheet (sheet SH33 in FIG. 9) after the formation of the first correction patch P is started. Therefore, an image is formed on the 20th sheet (sheet SH36 in FIG. 9) after the formation of the first correction patch P under the image forming condition corrected by the first correction amount calculated on the basis of the second correction patch P from the previous image forming condition. That is, an image is formed on the 20th sheet (sheet SH36 in FIG. 9) after the formation of the first correction patch P under the image forming condition corrected, from the image forming condition at the time of forming the first correction patch P, by the first correction amount calculated on the basis of the first correction patch P and the first correction amount calculated on the basis of the second correction patch P.

When the third correction patch P is formed, the first correction amount is again determined, and the image forming condition of the image former 20 is corrected by the first correction amount. Specifically, when the third correction patch P is formed, first, the density of the third correction patch P is measured. Next, the reference correction amount is calculated so that the density of the correction patch P reaches the target value. Next, an amount $\frac{1}{3}$ of the reference correction amount is determined as the first correction amount. Next, the image forming condition of the image former 20 is corrected by the first correction amount. In the example illustrated in FIG. 9, the first correction amount calculated on the basis of the third correction patch P is applied at the timing at which image formation on the 22nd sheet (sheet SH38 in FIG. 9) after the formation of the first correction patch P is started. Therefore, an image is formed on the 25th sheet (sheet SH41 in FIG. 9) after the formation of the first correction patch P under the image forming condition corrected by the first correction amount calculated on the basis of the third correction patch P from the previous image forming condition. That is, an image is formed on the 25th sheet (sheet SH41 in FIG. 9) after the formation of the first correction patch P under the image forming condition corrected, from the image forming condition at the time of forming the first correction patch P, by the first correction amount calculated on the basis of the first correction patch P, the first correction amount calculated on the basis of the second correction patch P, and the first correction amount calculated on the basis of the third correction patch P.

After that, the reference correction amount is calculated so that the density of the correction patch P reaches the target value every time the correction patch P is formed, an amount ⅓ of the reference correction amount is determined as the first correction amount, and the image forming condition of the image former 20 is corrected by the first correction amount.

Figure 10:
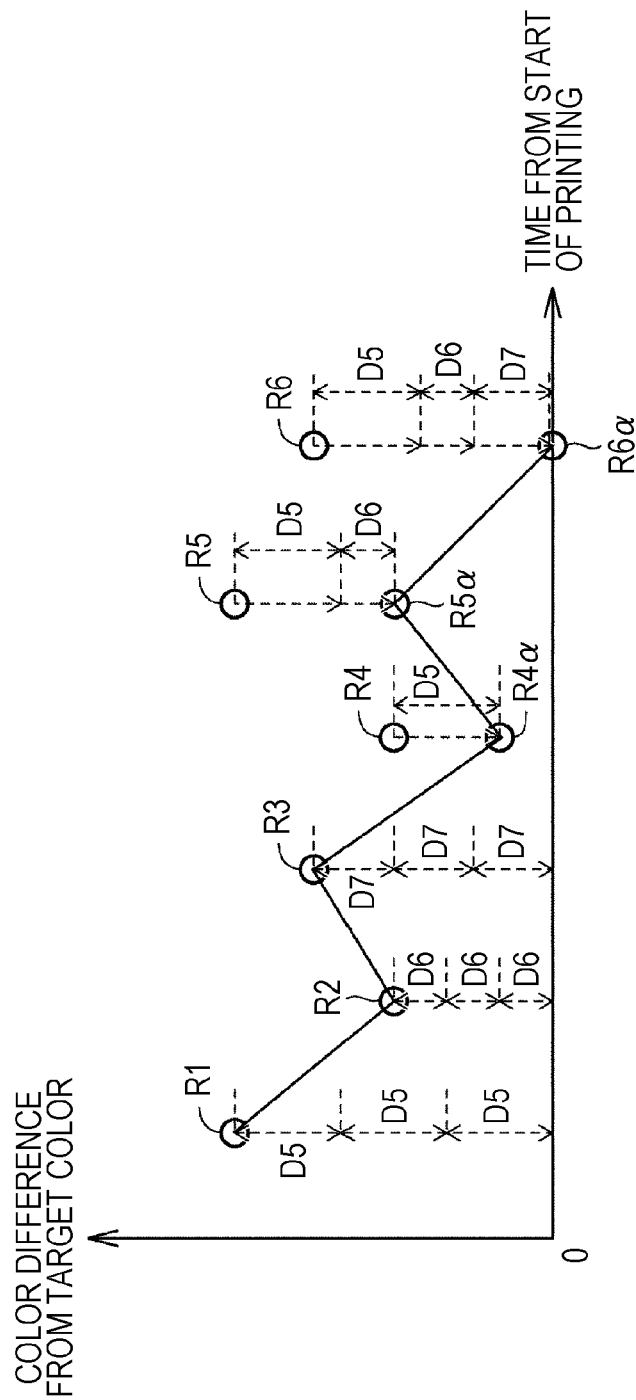
FIG. 10 is a diagram illustrating a change in color in a case where color correction with a method is performed.

A change in color when color correction with the method A is performed will be described with reference to FIG. 10. FIG. 10 is a diagram illustrating a change in color in a case where color correction with the method A is performed.

A color R1 indicates a color at the time of formation of the first correction patch P. A color R2 indicates a color at the time of image formation on the 5th sheet (sheet SH21 illustrated in FIG. 9) after the first correction patch P is formed. That is, the color R2 indicates the color at the time of formation of the second correction patch P. A color R3 indicates a color at the time of image formation on the 10th sheet (sheet SH26 illustrated in FIG. 9) after the first correction patch P is formed. That is, the color R3 indicates the color at the time of formation of the third correction patch P.

A color R4 indicates a color at the time of image formation on the 15th sheet (sheet SH31 illustrated in FIG. 9) after the first correction patch P is formed in a case where color correction is not performed. A color R5 indicates a color at the time of image formation on the 20th sheet (sheet SH36 illustrated in FIG. 9) after the first correction patch P is formed in a case where color correction is not performed. A color R6 indicates a color at the time of image formation on the 25th sheet (sheet SH41 illustrated in FIG. 9) after the first correction patch P is formed in a case where color correction is not performed.

A color R4α indicates a color at the time of image formation on the 15th sheet (sheet SH31 illustrated in FIG. 9) after the first correction patch P is formed in a case where color correction with the method A is performed. That is, the color R4α indicates a color at the time of forming the fourth correction patch P when the color correction with the method A is performed. A color R5α indicates a color at the time of image formation on the 20th sheet (sheet SH36 illustrated in FIG. 9) after the first correction patch P is formed in a case where color correction with the method A is performed. That is, the color R5α indicates a color at the time of formation of the fifth correction patch P when the color correction with the method A is performed. A color R6α indicates a color at the time of image formation on the 25th sheet (sheet SH41 illustrated in FIG. 9) after the first correction patch P is formed in a case where color correction with the method A is performed. That is, the color R6α indicates a color at the time of formation of the sixth correction patch P when the color correction with the method A is performed.

As described above, an image is formed on the 15th sheet (sheet SH31 in FIG. 9) after the formation of the first correction patch P under the image forming condition corrected by the first correction amount calculated on the basis of the first correction patch P from the image forming condition at the time of forming the first correction patch P. An image is formed on the 20th sheet (sheet SH36 in FIG. 9) after the formation of the first correction patch P under the image forming condition corrected, from the image forming condition at the time of forming the first correction patch P, by the first correction amount calculated on the basis of the first correction patch P and the first correction amount calculated on the basis of the second correction patch P. An image is formed on the 25th sheet (sheet SH41 in FIG. 9) after the formation of the first correction patch P under the image forming condition corrected, from the image forming condition at the time of forming the first correction patch P, by the first correction amount calculated on the basis of the first correction patch P, the first correction amount calculated on the basis of the second correction patch P, and the first correction amount calculated on the basis of the third correction patch P.

Therefore, the color at the time of image formation on the 15th sheet after the formation of the first correction patch P is the color R4α, the color at the time of image formation on the 20th sheet after the formation of the first correction patch P is the color R5α, and the color at the time of image formation on the 25th sheet after the formation of the first correction patch P is the color R6α. The color R4α is a color obtained by correcting the color R4 by a color difference D5. The color difference D5 is ⅓ of the color difference between the color R1 at the time of forming the first correction patch P and the target color. The color R5α is a color obtained by correcting the color R5 by the color difference D5 and a color difference D6. The color difference D6 is ⅓ of the color difference between the color R2 at the time of forming the second correction patch P and the target color. The color R6α is a color obtained by correcting the color R6 by the color difference D5, a color difference D6, and a color difference D7. The color difference D7 is ⅓ of the color difference between the color R3 at the time of forming the third correction patch P and the target color.

As illustrated in FIG. 10, overcorrection does not occur, and the corrected color R6α is a target color. In addition, since the correction is applied at the time of image formation on the 15th sheet after the formation of the first correction patch P, the time from the formation of the first correction patch P to the application of the correction is shorter than that in the above-described method B2. As described above, the method A with which color is corrected by the first correction amount smaller than the reference correction amount can suppress overcorrection without impairing the followability of correction to color variation. That is, with the color correction method by the image forming apparatus 100 in the first embodiment, overcorrection can be suppressed without impairing the followability of correction to color variation.

Although the planned number of calculations NT is three in the examples illustrated in FIGS. 9 and 10, the planned number of calculations NT is not limited thereto, and may be two or more. The planned number of calculations NT depends on the processing capability of the image forming apparatus 100. Specifically, the processing capability refers to capability related to processing of measuring the density of the correction patch P, processing of calculating the correction amount, processing of changing the image forming condition of the image former 20, and the like.

(d2: Overview of Color Correction Processing)

Figure 11:
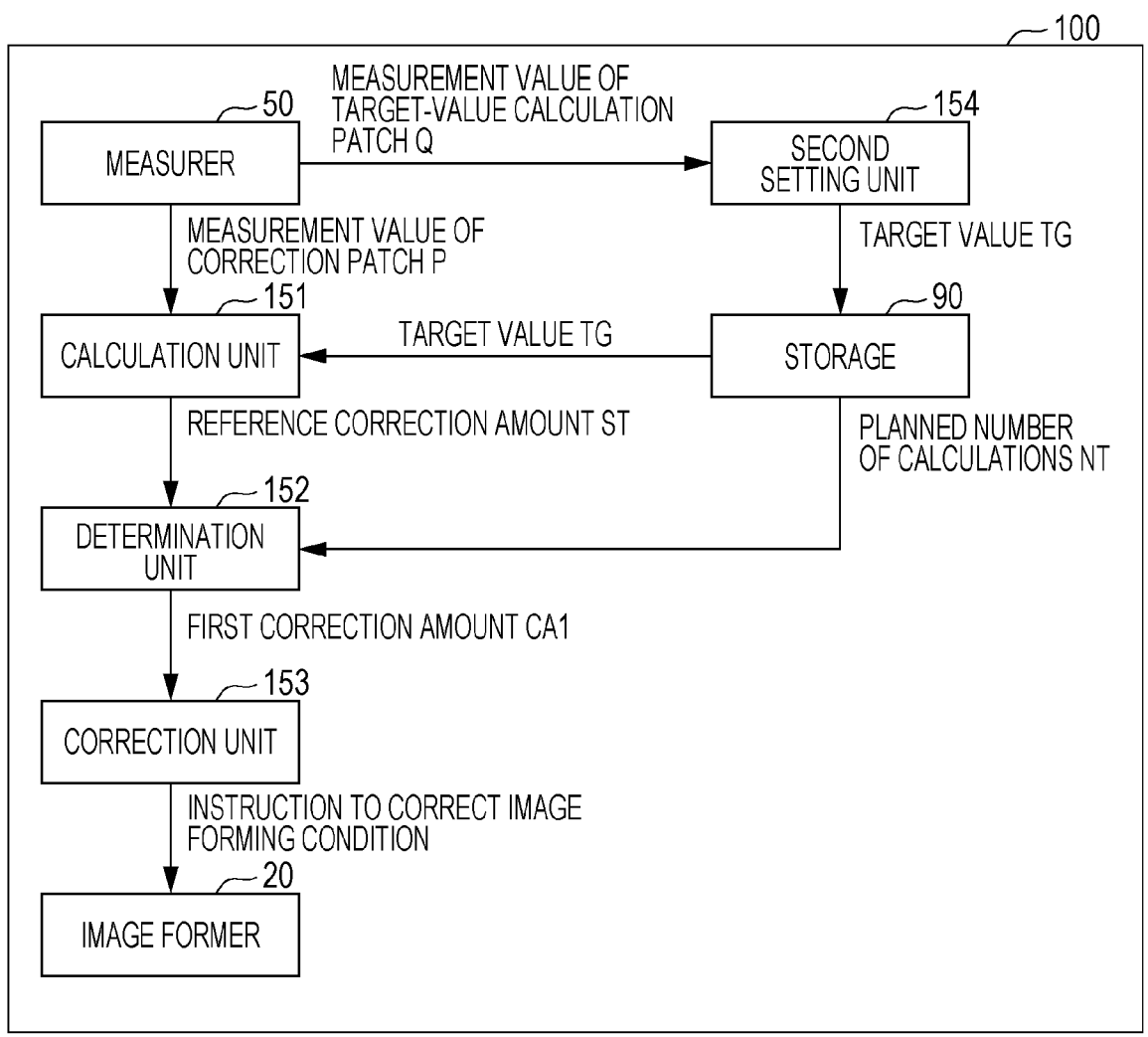
FIG. 11 is a diagram for describing an overview of color correction processing performed by the image forming apparatus according to the first embodiment.

FIG. 11 is a diagram for describing an overview of color correction processing performed by the image forming apparatus according to the first embodiment. The image forming apparatus 100 includes the measurer 50, the storage 90, the image former 20, a calculation unit 151, a determination unit 152, a correction unit 153, and a second setting unit 154. The calculation unit 151, the determination unit 152, the correction unit 153, and the second setting unit 154 are implemented by the processor 70 executing the program 91.

During the target-value calculation period, the measurer 50 measures the density of the target-value calculation patch Q formed on the conveyed sheet SH. In the present embodiment, the measurer 50 measures the density of the first target-value calculation patch Q, the density of the second target-value calculation patch Q, and the density of the third target-value calculation patch Q. When acquiring measurement values of the densities of the first to third target-value calculation patches Q from the measurer 50, the second setting unit 154 sets a representative value of the densities of the first to third target-value calculation patches Q as a target value TG. The representative value may be an average value or a median value. The target value TG is stored in the storage 90.

During the color correction period, the measurer 50 measures the density of the correction patch P formed on the conveyed sheet SH.

When acquiring the measurement value of the density of the correction patch P from the measurer 50, the calculation unit 151 acquires the target value TG from the storage 90, and calculates a reference correction amount ST so that the density of the correction patch P reaches the target value TG on the basis of the measurement value.

The determination unit 152 determines a first correction amount CA1 according to the planned number of calculations NT of the reference correction amount ST during the period from the formation of the correction patch P to the correction of the image forming condition. Specifically, when acquiring the reference correction amount ST from the calculation unit 151, the determination unit 152 acquires the planned number of calculations NT from the storage 90 and calculates the first correction amount CA1 using following Expression 1.

(first correction amount CA1)=(reference correction amount ST)/(planned number of calculations NT)   (Expression 1)

When acquiring the first correction amount CA1 from the determination unit 152, the correction unit 153 corrects the image forming condition of the image former 20 by the first correction amount CA1. Specifically, the correction unit 153 outputs a correction instruction to correct the image forming condition to the image former 20 so that the image forming condition of the image former 20 is corrected by the first correction amount CA1. The image former 20 corrects the image forming condition according to the correction instruction and forms an image under the corrected image forming condition.

Figure 12:
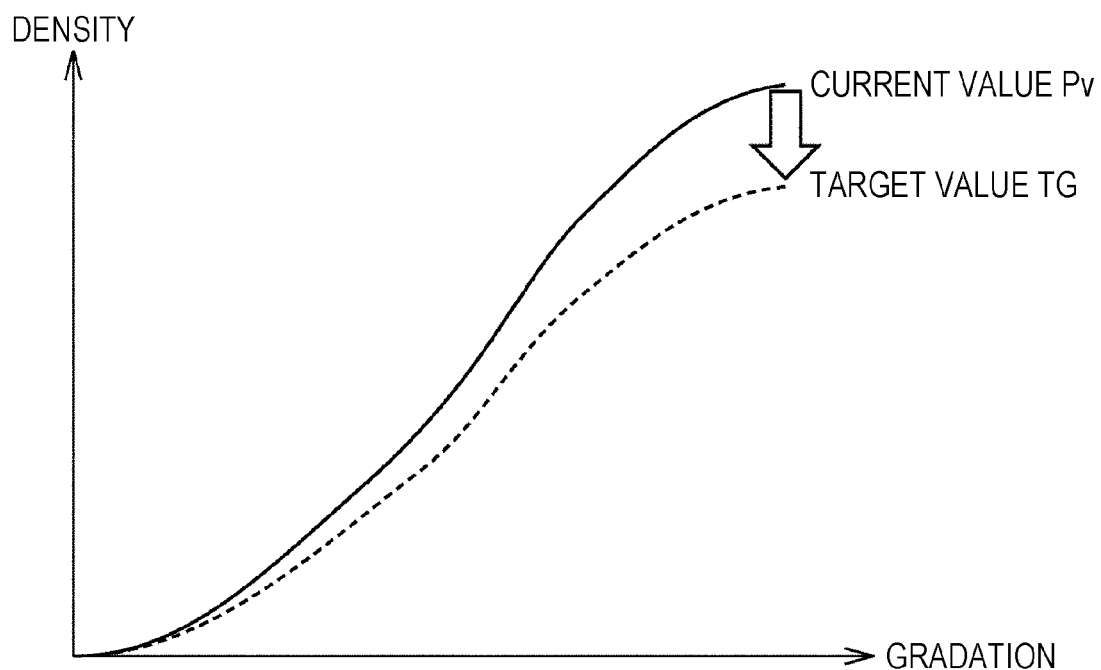
FIG. 12 is a diagram for describing an example of correction of an image forming condition by the image forming apparatus according to the first embodiment.

FIG. 12 is a diagram for describing an example of correction of the image forming condition by the image forming apparatus according to the first embodiment. Referring to FIG. 12, a "current value Pv" in FIG. 12 indicates the density of the correction patch P measured by the measurer 50. For example, it is assumed that the density of the correction patch P measured by the measurer 50 is higher by 10% than the target value TG. In such a case, the correction unit 153 issues a correction instruction to the image former 20 so that the development potential of the developing device 24 decreases by 10%. The correction unit 153 may correct the y curve so as to match the gradation curve. Furthermore, the correction unit 153 may correct data of a three-dimensional look up table (3D-LUT) as gradation data. The 3D-LUT is stored in the storage 90 described above.

FIG. 13 is a diagram illustrating an example of a change in development potential according to the first embodiment. In FIG. 13, "patch No." indicates an mth correction patch P (m is an integer of 1 or more). FIG. 13 illustrates a "development potential Vc" at the time of forming each correction patch P, the "reference correction amount ST" calculated on the basis of the density of each correction patch P, and the "first correction amount CA1" calculated on the basis of the reference correction amount ST. In the present embodiment, the planned number of calculations NT is set to three, and thus, the first correction amount CA1 is ⅓ of the reference correction amount ST.

As can be seen from the example illustrated in FIG. 9, in the present embodiment, the first correction patch P to which the first correction amount CA1 is started to be applied is the fourth correction patch P. Therefore, the development potential Vc at the time of forming the second correction patch P and the development potential Vc at the time of forming the third correction patch P remain at the development potential Vc (−500 V) which is the potential at the time of forming the first correction patch P.

The fourth correction patch P is formed under the image forming condition corrected by the first correction amount CA1 calculated on the basis of the density of the first correction patch P. Therefore, the development potential Vc (−503.3 V) at the time of forming the fourth correction patch P has a value corrected from the latest development potential Vc (−500 V) by the first correction amount CA1 (−3.3 V) calculated on the basis of the density of the first correction patch P.

In addition, the fifth correction patch P is formed under the image forming condition corrected by the first correction amount CA1 calculated on the basis of the density of the second correction patch P. Therefore, the development potential Vc (−509.3 V) at the time of forming the fifth correction patch P has a value corrected from the latest development potential Vc (−503.3 V) by the first correction amount CA1 (−6.0 V) calculated on the basis of the density of the second correction patch P.

The sixth correction patch P is formed under the image forming condition corrected by the first correction amount CA1 calculated on the basis of the density of the third correction patch P. Therefore, the development potential Vc (−518.8 V) at the time of forming the sixth correction patch P has a value corrected from the latest development potential Vc (−509.3 V) by the first correction amount CA1 (−9.5 V) calculated on the basis of the density of the third correction patch P.

In addition, the seventh correction patch P is formed under the image forming condition corrected by the first correction amount CA1 calculated on the basis of the density of the fourth correction patch P. Therefore, the development potential Vc (−526.9 V) at the time of forming the seventh correction patch P has a value corrected from the latest development potential Vc (−518.8 V) by the first correction amount CA1 (−8.1 V) calculated on the basis of the fourth correction patch P.

(d3: Processing Procedure)

Figure 14:
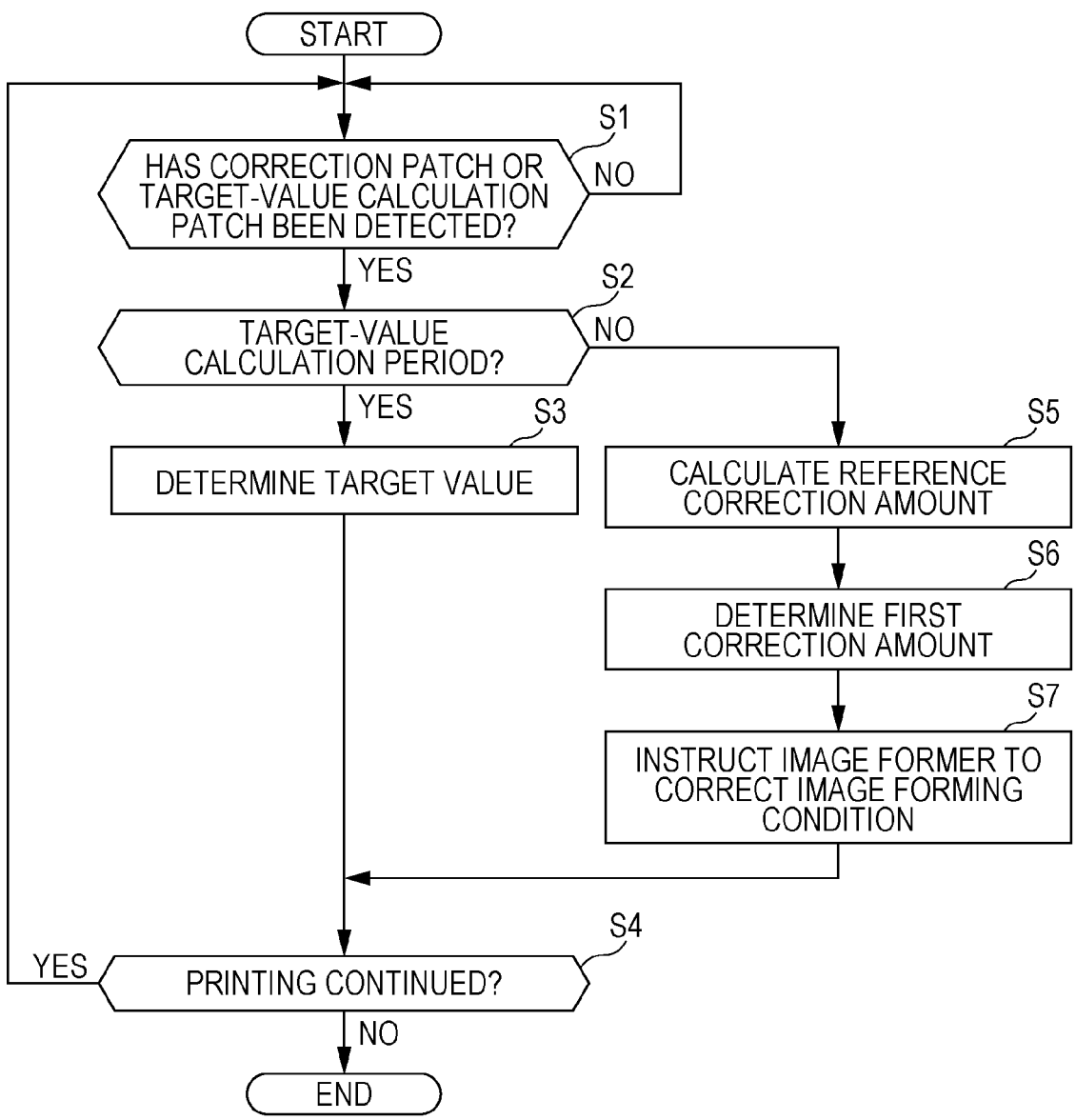
FIG. 14 is a flowchart for describing a procedure of the color correction processing performed by the image forming apparatus according to the first embodiment.

FIG. 14 is a flowchart for describing a procedure of the color correction processing performed by the image forming apparatus according to the first embodiment. The color correction processing illustrated in FIG. 14 is executed by the processor 70 described above.

In step S1, the processor 70 determines whether or not the correction patch P or the target-value calculation patch Q has been detected. When receiving the measurement result from the measurer 50, the processor 70 determines that the correction patch P or the target-value calculation patch Q has been detected. When the correction patch P or the target-value calculation patch Q has been detected (YES in step S1), the processor 70 proceeds to step S2.

In step S2, the processor 70 determines whether or not it is a target-value calculation period. When it is the target-value calculation period (YES in step S2), the processor 70 proceeds to step S3. On the other hand, when it is not the target-value calculation period (NO in step S2), the processor 70 proceeds to step S5.

In step S3, the processor 70 determines the target value TG and stores the target value TG in the storage 90.

In step S4, the processor 70 determines whether or not printing is continued. When printing is continued (YES in step S4), the processor 70 returns to step S1. On the other hand, when printing is not continued (NO in step S4), the processor 70 ends the color correction processing.

In step S5, the processor 70 calculates the reference correction amount ST.

In step S6, the processor 70 determines the first correction amount CAL

In step S7, the processor 70 instructs the image former 20 to correct the image forming condition so that the image forming condition of the image former 20 is corrected by the first correction amount CAL After step S7, the processor 70 proceeds to step S4.

As described above, in the image forming apparatus 100 according to the first embodiment, the image forming condition of the image former 20 is corrected by the first correction amount CA1 smaller than the reference correction amount ST. The first correction amount CA1 is calculated on the basis of the density of the first correction patch P. Therefore, color correction can be performed from an earlier stage, and the influence of density unevenness of the correction patch P can be suppressed. Accordingly, the image forming apparatus 100 according to the first embodiment can suppress overcorrection without impairing the followability of correction to color variation.

The target value TG in the color correction may be calculated at the time of test printing performed before the start of continuous printing. When the target value TG in the color correction is calculated at the time of test printing performed before the start of continuous printing, first, the image former 20 forms the target-value calculation patch Q a plurality of times at the time of test printing. Next, the measurer 50 measures the density of each of the target-value calculation patches Q. Next, the second setting unit 154 acquires the densities of the target-value calculation patches Q from the measurer 50, and sets a representative value of the acquired densities as the target value TG. When the target value TG in color correction is calculated at the time of test printing performed before the start of continuous printing, the correction patch P may be formed on the 1st sheet of the continuous printing.

Second Embodiment

The first embodiment has described the case where the value obtained by dividing the reference correction amount ST by the planned number of calculations NT is determined as the first correction amount CAL The second embodiment will describe a case where a value greater than the value obtained by dividing the reference correction amount ST by the planned number of calculations NT is determined as the first correction amount CA1 in an initial stage of continuous printing. Note that, since an image forming apparatus according to the second embodiment has a hardware configuration similar to that of the image forming apparatus 100 described with reference to FIG. 4, the same components are denoted by the same reference numerals, and the description thereof will not be repeated.

Here, differences between color correction processing performed by the image forming apparatus 100 in the second embodiment and the color correction processing performed by the image forming apparatus 100 in the first embodiment will be described. The difference between the color correction processing performed by the image forming apparatus 100 in the second embodiment and the color correction processing described with reference to FIG. 11 is an expression used by the determination unit 152 to calculate the first correction amount CAL In the second embodiment, when acquiring the reference correction amount ST from the calculation unit 151, the determination unit 152 calculates the first correction amount CA1 using following Expression 2.

(first correction amount CA1)=(reference correction amount ST)/(planned number of calculations NT)×(increase rate Z)     (Expression 2)

Note that, since the processing procedure performed by the image forming apparatus 100 in the second embodiment is the same as the processing procedure described with reference to FIG. 14, the description thereof will not be repeated here.

FIG. 15 is a diagram illustrating an example of the first correction amount according to the second embodiment. In FIG. 15, "patch No." indicates an mth correction patch P (m is an integer of 1 or more). FIG. 15 illustrates a "development potential Vc" at the time of forming each correction patch P, the "reference correction amount ST" calculated on the basis of the density of each correction patch P, an "increase rate Z", and the "first correction amount CA1" calculated on the basis of the reference correction amount ST. In the present embodiment, the planned number of calculations NT is also three.

As illustrated in FIG. 15, in the present embodiment, the "increase rate Z" is set to a value greater than 1.0 in the initial stage of continuous printing, for example, from the start of continuous printing to the start of formation of the third correction patch P, and then the "increase rate Z" is set to 1.0. Thus, in the present embodiment, the first correction amount CA1 calculated from the correction patch P formed in the initial stage of the continuous printing is determined to be a value greater than the value obtained by dividing the reference correction amount ST by the planned number of calculations NT, and the first correction amount CA1 calculated from the correction patch P formed after the end of the initial stage of the continuous printing is determined to be a value obtained by dividing the reference correction amount ST by the planned number of calculations NT.

Specifically, the first correction amount CA1 (−4.0 V) calculated on the basis of the density of the first correction patch P has a value obtained by multiplying a value ⅓ of the reference correction amount ST (−9.9 V) calculated on the basis of the density of the first correction patch P by the increase rate Z (1.2).

The first correction amount CA1 (−6.6 V) calculated on the basis of the density of the second correction patch P has a value obtained by multiplying a value ⅓ of the reference correction amount ST (−18.0 V) calculated on the basis of the density of the second correction patch P by the increase rate Z (1.1).

The first correction amount CA1 calculated on the basis of the density of the third or subsequent correction patch P has a value obtained by multiplying a value ⅓ of the reference correction amount ST calculated on the basis of the density of the correction patch P by the increase rate Z (1.0).

In this way, the determination unit 152 determines a value greater than the value obtained by dividing the reference correction amount ST by the planned number of calculations NT as the first correction amount CA1 in the initial stage of continuous printing.

In general, color is likely to vary in the initial stage of continuous printing. This is because the rate of replacement of toner in the developing device 24, the charged amount of the toner in the developing device 24, and the temperature and humidity in the image forming apparatus 100 change.

For example, when the user-designated image I is different between the previous continuous printing and the current continuous printing, an image coverage indicating a toner consumption amount is different between the previous continuous printing and the current continuous printing. For this reason, the image coverage is likely to change in the initial stage of continuous printing. When the image coverage changes, the rate of replacement of toner in the developing device 24 changes. When the rate of replacement of toner in the developing device 24 decreases, the charged amount of toner in the developing device 24 increases and the developability changes, so that color variation occurs.

In the initial stage of the continuous printing, the developer is started to be stirred in the developing device 24, and thus, the charged amount of toner in the developing device 24 is likely to increase. When the charged amount of toner in the developing device 24 increases, the developability changes, so that color variation Occurs.

In the initial stage of continuous printing, the temperature and humidity in the image forming apparatus 100 are likely to change with an increase in the fixing temperature, switching of the operation of a cooling fan in the image forming apparatus 100, and the like. When the temperature and humidity in the image forming apparatus 100 change, color variation occurs.

In the second embodiment, a value greater than the value obtained by dividing the reference correction amount ST by the planned number of calculations NT is determined as the first correction amount CA1 in the initial stage of continuous printing in which color variation is likely to occur. Therefore, the image forming apparatus 100 according to the second embodiment can improve followability of correction to color variation.

In FIG. 15, the increase rate Z in the initial stage of the continuous printing is set to a greater value as the first correction amount CA1 is calculated at an earlier timing, but the increase rate Z in the initial stage of the continuous printing may be uniform regardless of the calculation timing of the first correction amount CA1. When the increase rate Z in the initial stage of continuous printing is set to a greater value as the first correction amount CA1 is calculated earlier, the followability of correction to color variation is improved.

Third Embodiment

The first embodiment has described the case where the value obtained by dividing the reference correction amount ST by the planned number of calculations NT is determined as the first correction amount CAL The third embodiment will describe a case where the first correction amount CA1 is adjusted according to a change in a factor that affects color during continuous printing.

Figure 16:
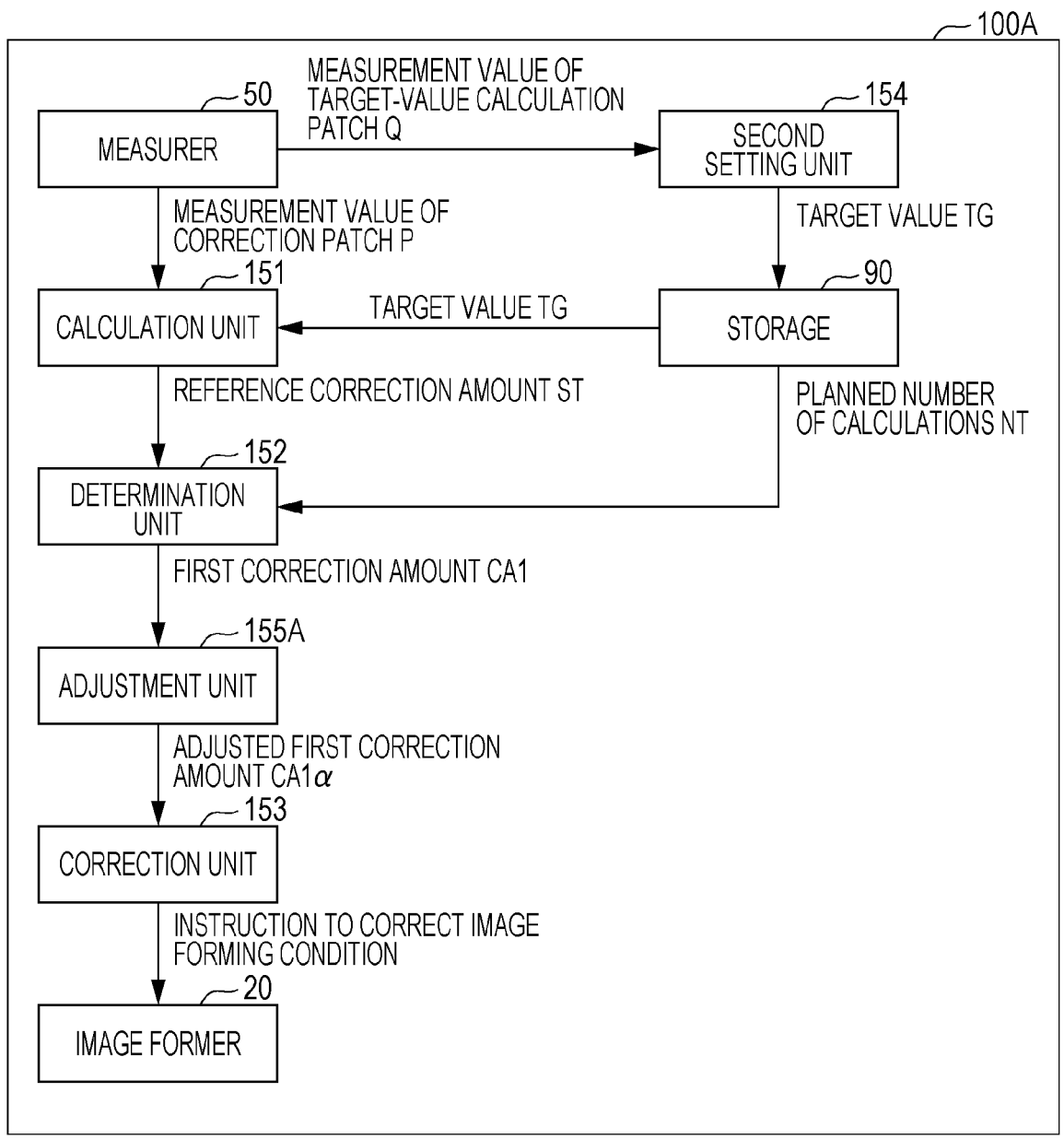
FIG. 16 is a diagram for describing an overview of color correction processing performed by an image forming apparatus according to a third embodiment.

FIG. 16 is a diagram for describing an overview of color correction processing performed by an image forming apparatus according to the third embodiment. An image forming apparatus 100A according to the third embodiment has a hardware configuration similar to that of the image forming apparatus 100 described with reference to FIG. 4, and thus, the same components are denoted by the same reference numerals, and the description thereof will not be repeated.

On the other hand, the color correction processing performed by the image forming apparatus 100A according to the third embodiment is different from the color correction processing performed by the image forming apparatus 100 according to the first embodiment. Here, differences between the color correction processing performed by the image forming apparatus 100A according to the third embodiment and the color correction processing performed by the image forming apparatus 100 according to the first embodiment will be described. Note that, since the processing procedure performed by the image forming apparatus 100A according to the third embodiment is the same as the processing procedure described with reference to FIG. 14, the description thereof will not be repeated here.

The difference between the color correction processing performed by the image forming apparatus 100A according to the third embodiment and the color correction processing described with reference to FIG. 11 is that the image forming apparatus 100A further has an adjustment unit 155A. The adjustment unit 155A is implemented by the processor 70 executing the program 91.

The adjustment unit 155A adjusts the first correction amount CA1 determined by the determination unit 152 according to a change in a factor that affects color. That is, the adjustment unit 155A adjusts the first correction amount CA1 calculated by the determination unit 152 using Expression 1 described above according to a change in a factor that affects color. The adjustment unit 155A outputs an adjusted first correction amount CA1α to the correction unit 153. When acquiring the adjusted first correction amount CA1α, the correction unit 153 corrects the image forming condition of the image former 20 by the adjusted first correction amount CA1α.

Factors affecting color include at least one of an image coverage, a charged amount of toner in the developing device 24, a standby time from the end of previous printing to the start of current printing, a temperature in the image forming apparatus 100A, and humidity in the image forming apparatus 100A.

As an example, when the coverage of the user-designated image I changes during continuous printing, the adjustment unit 155A increases the first correction amount CA1. Specifically, the adjustment unit 155A compares the image coverage at the time of forming the correction patch P with the image coverage at the time of applying the first correction amount CA1 calculated on the basis of the density of the correction patch P, and increases the first correction amount CA1 as the difference between them is larger.

As another example, a device for measuring the charged amount of toner in the developing device 24 may be provided in the image forming apparatus 100A, and the adjustment unit 155A may increase the first correction amount CA1 when the charged amount of toner in the developing device 24 increases during continuous printing.

As another example, a device that measures a standby time from the end of the previous printing to the start of the current printing may be provided in the image forming apparatus 100A, and the adjustment unit 155A may increase the first correction amount CA1 as the standby time is longer.

As another example, a device for measuring the temperature in the image forming apparatus 100A may be provided in the image forming apparatus 100A, and the adjustment unit 155A may increase the first correction amount CA1 when the temperature greatly changes during continuous printing.

As another example, a device for measuring the humidity in the image forming apparatus 100A may be provided in the image forming apparatus 100A, and the adjustment unit 155A may increase the first correction amount CA1 when the humidity greatly changes during continuous printing.

Regarding how much the first correction amount CA1 is increased, it is assumed that a value determined on the basis of experimental results is set in the image forming apparatus 100A in advance.

In general, color is likely to vary when the coverage of the user-designated image I changes. Further, when the charged amount of toner in the developing device 24 increases, the developability changes, so that color is likely to vary. In addition, as the standby time is longer, the charged amount of toner in the developing device 24 is more likely to change, or the temperature and humidity in the image forming apparatus 100A are more likely to change. When the charged amount of toner in the developing device 24 or the temperature and humidity in the image forming apparatus 100A change, color is likely to vary.

As described above, in the third embodiment, the first correction amount CA1 is adjusted according to a change in the factor that affects color. Therefore, the image forming apparatus 100A according to the third embodiment can improve followability of correction to color variation.

Fourth Embodiment

Figure 17:
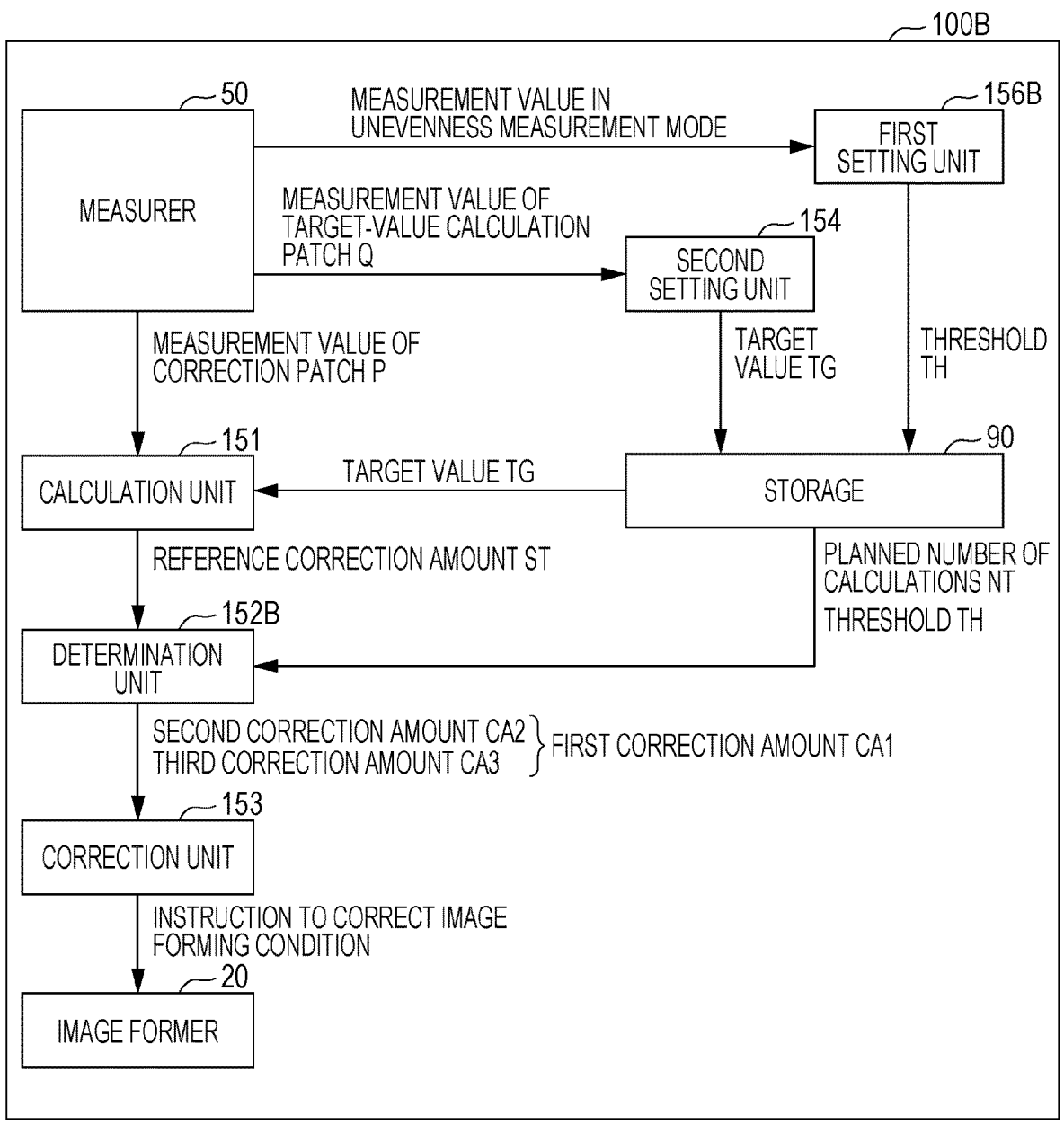
FIG. 17 is a diagram for describing an overview of color correction processing performed by an image forming apparatus according to a fourth embodiment.

The first embodiment has described the case where the value obtained by dividing the reference correction amount ST by the planned number of calculations NT is determined as the first correction amount CAL The fourth embodiment will describe a case where the sum of a second correction amount determined for an intra-threshold correction amount in the reference correction amount ST and a third correction amount determined for an extra-threshold correction amount in the reference correction amount ST as the first correction amount CAL FIG. 17 is a diagram for describing an overview of color correction processing performed by an image forming apparatus according to the fourth embodiment. An image forming apparatus 100B according to the fourth embodiment has a hardware configuration similar to that of the image forming apparatus 100 described with reference to FIG. 4, and thus, the same components are denoted by the same reference numerals, and the description thereof will not be repeated.

On the other hand, the image forming apparatus 100B according to fourth embodiment is different from the image forming apparatus 100 according to first embodiment in being switchable from an image forming mode to an unevenness measurement mode for measuring the density unevenness of the correction patch P. In addition, the color correction processing performed by the image forming apparatus 100B according to the fourth embodiment is different from the color correction processing performed by the image forming apparatus 100 according to the first embodiment. Here, differences between the color correction processing performed by the image forming apparatus 100B according to the fourth embodiment and the color correction processing performed by the image forming apparatus 100 according to the first embodiment will be described.

The difference between the color correction processing performed by the image forming apparatus 100B according to the fourth embodiment and the color correction processing described with reference to FIG. 11 is that the image forming apparatus 100B has a determination unit 152B in place of the determination unit 152 and further has a first setting unit 156B. The determination unit 152B and the first setting unit 156B are implemented by the processor 70 executing the program 91.

In the unevenness measurement mode, the measurer 50 measures the density of the correction patch P every time the sheet SH on which the correction patch P is formed is conveyed, and outputs the measurement value to the first setting unit 156B. Thus, the first setting unit 156B acquires a plurality of measurement values.

The first setting unit 156B sets a threshold TH of the reference correction amount ST on the basis of the measurement value obtained from the measurer 50 in the unevenness measurement mode. The threshold TH is set according to a range of the reference correction amount ST predicted to vary due to the density unevenness of the correction patch P.

As an example, the first setting unit 156B specifies the density of the correction patch P having the largest difference from the target value TG based on the plurality of measurement values acquired from the measurer 50, and calculates the correction amount so that the density of the correction patch P reaches the target value TG. The first setting unit 156B stores the correction amount in the storage 90 as the threshold TH.

With the setting of the threshold TH as described above, it can be determined that the cause of the color variation is the density unevenness of the correction patch P when the reference correction amount ST calculated by the calculation unit 151 is within the threshold TH. When the reference correction amount ST calculated by the calculation unit 151 is within the threshold TH, the reference correction amount ST can be considered to be a correction amount for color variation due to density unevenness of the correction patch P.

On the other hand, when the reference correction amount ST calculated by the calculation unit 151 exceeds the threshold TH, it can be determined that the cause of the color variation includes the density unevenness of the correction patch P and a factor other than the density unevenness of the correction patch P. When the reference correction amount ST calculated by the calculation unit 151 exceeds the threshold TH, an amount corresponding to the threshold TH in the reference correction amount ST can be considered to be the correction amount for the color variation due to the density unevenness of the correction patch P, and an amount exceeding the threshold TH in the reference correction amount ST can be considered to be the correction amount for the color variation due to a factor other than the density unevenness of the correction patch P.

Factors other than the factor due to the density unevenness of the correction patch P include at least one of an image coverage, a charged amount of toner in the developing device 24, a standby time from the end of previous printing to the start of current printing, a temperature in the image forming apparatus 100B, and humidity in the image forming apparatus 100B.

When acquiring the reference correction amount ST from the calculation unit 151, the determination unit 152B first acquires the planned number of calculations NT and the threshold TH from the storage 90. Next, the determination unit 152B calculates a second correction amount CA2 and a third correction amount CA3, and determines the sum of the second correction amount CA2 and the third correction amount CA3 as the first correction amount CA1.

Note that, since the processing procedure performed by the image forming apparatus 100B according to the fourth embodiment is the same as the processing procedure described with reference to FIG. 14, the description thereof will not be repeated here.

Figure 18:
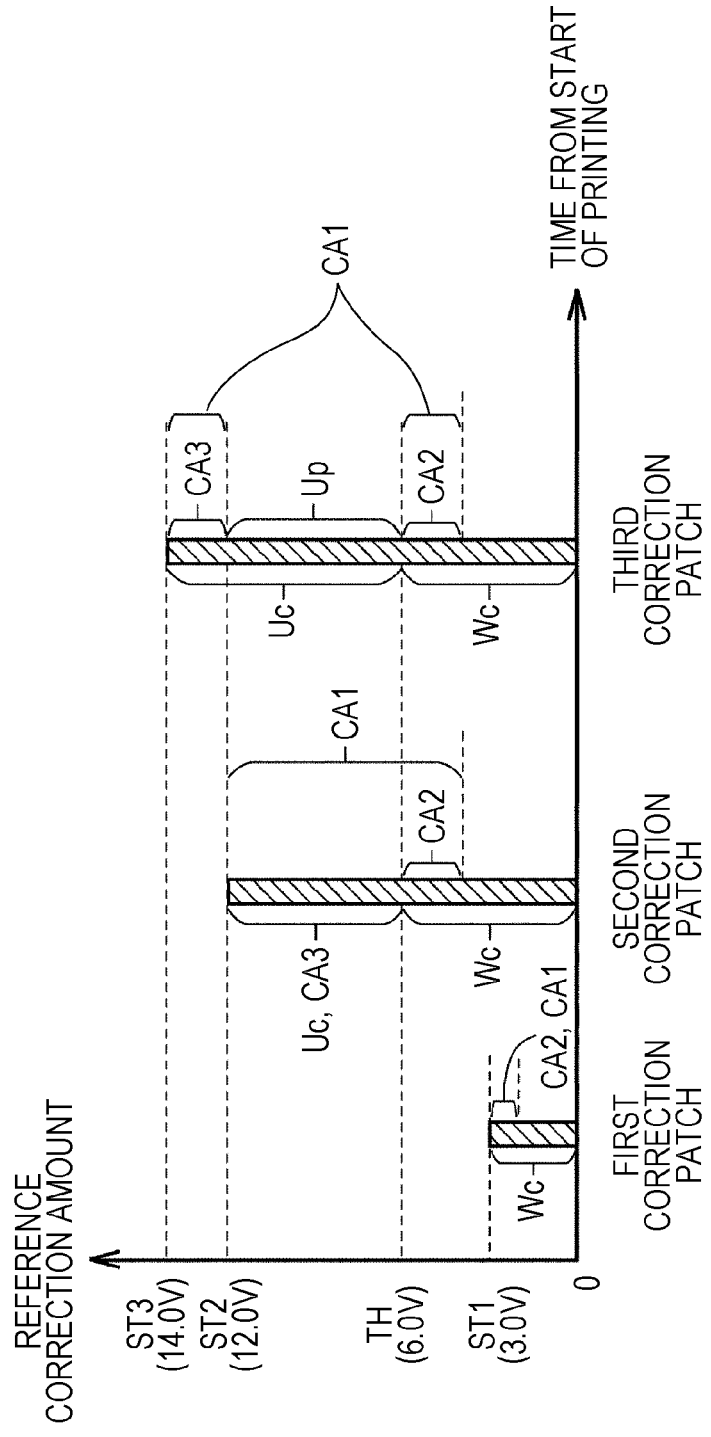
FIG. 18 is a diagram for describing a method for calculating a first correction amount in the fourth embodiment.

Next, a method for calculating the first correction amount CA1 by the determination unit 152B will be described with reference to FIGS. 18 and 19. In the present embodiment, the planned number of calculations NT is also three. FIG. 18 is a diagram for describing the method for calculating the first correction amount in the fourth embodiment. FIG. 19 is a diagram illustrating an example of various correction amounts illustrated in FIG. 18.

In FIG. 18, "reference correction amount ST1" indicates a reference correction amount calculated on the basis of the density of the first correction patch P, "reference correction amount ST2" indicates a reference correction amount calculated on the basis of the density of the second correction patch P, and "reference correction amount ST3" indicates a reference correction amount calculated on the basis of the density of the third correction patch P. In the following description, when the reference correction amount ST1, the reference correction amount ST2, and the reference correction amount ST3 are not distinguished, they are referred to as "reference correction amount ST".

In FIG. 19, "patch No." indicates an mth correction patch P (m is an integer of 1 or more). FIG. 19 illustrates the "reference correction amount ST", an "intra-threshold correction amount Wc", the "second correction amount CA2", a "current extra-threshold correction amount Uc", a "previous extra-threshold correction amount Up", the "third correction amount CA3", and the "first correction amount CA1" which are calculated on the basis of the density of each of the correction patches P.

In FIGS. 18 and 19, it is assumed that the reference correction amount ST1 is 3.0 V, the reference correction amount ST2 is 12.0 V, and the reference correction amount ST3 is 14.0 V. In FIGS. 18 and 19, the threshold TH is 6.0 V.

Referring to FIGS. 18 and 19, the intra-threshold correction amount Wc indicates a correction amount within the threshold TH in the reference correction amount ST. When the reference correction amount ST is within the threshold TH, the determination unit 152B determines the reference correction amount ST as the intra-threshold correction amount Wc. On the other hand, when the reference correction amount ST exceeds the threshold TH, the determination unit 152B determines the threshold TH as the intra-threshold correction amount Wc.

In the example illustrated in FIGS. 18 and 19, the intra-threshold correction amount Wc in the reference correction amount ST1 is 3.0 V, the intra-threshold correction amount Wc in the reference correction amount ST2 is 6.0 V, and the intra-threshold correction amount Wc in the reference correction amount ST3 is 6.0 V.

The determination unit 152B determines the second correction amount CA2 according to the intra-threshold correction amount Wc and the planned number of calculations NT. The second correction amount CA2 is a correction amount determined for the intra-threshold correction amount Wc in the reference correction amount ST. As an example, the determination unit 152B calculates the second correction amount CA2 using following Expression 3.

$$\text{(second correction amount CA2)} = \text{(intra-threshold correction amount Wc)}/\text{(planned number of calculations NT)} \quad \text{(Expression 3)}$$

In the example illustrated in FIGS. 18 and 19, the second correction amount CA2 calculated on the basis of the first correction patch P is 1.0 V. In addition, the second correction amount CA2 calculated on the basis of the second correction patch P and the second correction amount CA2 calculated on the basis of the third correction patch P are both 2.0 V.

The extra-threshold correction amount indicates a correction amount exceeding the threshold TH in the reference correction amount ST. The current extra-threshold correction amount Uc indicates an extra-threshold correction amount calculated on the basis of the current density of the correction patch P. When the reference correction amount ST is within the threshold TH, the determination unit 152B determines the current extra-threshold correction amount Uc as zero. On the other hand, when the reference correction amount ST exceeds the threshold TH, the determination unit 152B calculates the current extra-threshold correction amount Uc using following Expression 4.

$$\text{(current extra-threshold correction amount Uc)} = \text{(reference correction amount ST)} - \text{(threshold TH)} \quad \text{(Expression 4)}$$

In the example illustrated in FIGS. 18 and 19, the extra-threshold correction amount Uc in the reference correction amount ST1 is 0 V, the current extra-threshold correction amount Uc in the reference correction amount ST2 is 6.0 V, and the current extra-threshold correction amount Uc in the reference correction amount ST3 is 8.0 V.

The previous extra-threshold correction amount Up indicates an extra-threshold correction amount calculated on the basis of the previous density of the correction patch P. When calculating the first correction amount CA1 on the basis of the first correction patch P, the determination unit 152B determines the previous extra-threshold correction amount Up to 0. The determination unit 152B also determines the previous extra-threshold correction amount Up to 0, when calculating the first correction amount CA1 on the basis of the second and subsequent correction patches P and when the previous reference correction amount ST is within the threshold TH.

In the example illustrated in FIGS. 18 and 19, the previous extra-threshold correction amount Up in the reference correction amount ST1 is 0 V, the previous extra-threshold correction amount Up in the reference correction amount ST2 is 0 V, and the previous extra-threshold correction amount Up in the reference correction amount ST3 is 6.0 V.

The determination unit 152B calculates the third correction amount CA3 using following Expression 5. The third correction amount CA3 is a correction amount determined for the extra-threshold correction amount in the reference correction amount ST.

$$\text{(third correction amount CA3)} = \text{(current extra-threshold correction amount Uc)} - \text{(previous extra-threshold correction amount Up)} \quad \text{(Expression 5)}$$

In the example illustrated in FIGS. 18 and 19, the third correction amount CA3 in the reference correction amount ST1 is 0 V, the third correction amount CA3 in the reference correction amount ST2 is 6.0 V, and the third correction amount CA3 in the reference correction amount ST3 is 2.0 V.

The determination unit 152B calculates the first correction amount CA1 using following Expression 6.

(first correction amount CA1)=(second correction amount CA2)+(third correction amount CA3)  (Expression 6)

In the example illustrated in FIGS. 18 and 19, the first correction amount CA1 calculated on the basis of the first correction patch P is 1.0 V, the first correction amount CA1 calculated on the basis of the second correction patch P is 8.0 V, and the first correction amount CA1 calculated on the basis of the third correction patch P is 4.0 V.

As described above, in the fourth embodiment, the second correction amount CA2 determined for the intra-threshold correction amount Wc in the reference correction amount ST is smaller than the intra-threshold correction amount Wc. The intra-threshold correction amount Wc is a correction amount for color variation due to density unevenness of the correction patch P. Since the second correction amount CA2 is smaller than the intra-threshold correction amount Wc, overcorrection is suppressed.

The third correction amount CA3 determined for the extra-threshold correction amount in the reference correction amount ST is a value obtained by subtracting the previous extra-threshold correction amount Up from the current extra-threshold correction amount Uc. The extra-threshold correction amount is a correction amount for color variation due to factors other than density unevenness of the correction patch P. As the third correction amount CA3 determined for the extra-threshold correction amount, a value obtained by subtracting the previous extra-threshold correction amount Up from the current extra-threshold correction amount Uc is adopted, instead of a value obtained by further subtracting the value obtained by subtracting the previous extra-threshold correction amount Up from the current extra-threshold correction amount Uc. Therefore, it is possible to prevent the followability of the correction to color variation from being impaired.

In addition, not the current extra-threshold correction amount Uc but a value obtained by subtracting the previous extra-threshold correction amount Up from the current extra-threshold correction amount Uc is adopted as the third correction amount CA3, whereby overcorrection is suppressed.

In the above description, the threshold TH is set on the basis of the measurement value of the measurer 50 in the unevenness measurement mode, but the threshold TH determined on the basis of experimental results may be set in advance in the image forming apparatus 100B. In a case where the threshold TH is set in the image forming apparatus 100B in advance, the image forming apparatus 100B may not be able to switch from the image forming mode to the unevenness measurement mode.

In addition, the determination unit 152B may determine a value larger than the value obtained by dividing the intra-threshold correction amount We by the planned number of calculations NT as the second correction amount CA2 in an initial stage of continuous printing.

Other Embodiments

The second embodiment and the third embodiment may be combined.

Although embodiments of the present invention have been described and illustrated in detail, the disclosed embodiments are made for purposes of illustration and example only and not limitation. The scope of the present invention should be interpreted by terms of the appended claims, and includes any modifications within the scope of the claims and their equivalents.

What is claimed is:

1. An image forming apparatus comprising:
   an image former that forms a correction patch using toner;
   a measurer that measures a color, a density, or a deposited amount of toner of the correction patch; and
   a hardware processor that calculates a reference correction amount on the basis of a measurement value of the measurer so that the density of the correction patch reaches a target value, and
   corrects an image forming condition of the image former by a first correction amount smaller than the reference correction amount.

2. The image forming apparatus according to claim 1, wherein the hardware processor further determines the first correction amount according to a planned number of calculations of the reference correction amount in a period from formation of the correction patch until the image forming condition is corrected.

3. The image forming apparatus according to claim 2, wherein the hardware processor determines, as the first correction amount, a value obtained by dividing the reference correction amount by the planned number of calculations.

4. The image forming apparatus according to claim 2, wherein the hardware processor determines, as the first correction amount, a value greater than a value obtained by dividing the reference correction amount by the planned number of calculations in an initial stage of continuous printing.

5. The image forming apparatus according to claim 1, wherein,
   when the reference correction amount exceeds a threshold, the first correction amount is a sum of a second correction amount determined for an intra-threshold correction amount that corresponds to the threshold in the reference correction amount and a third correction amount determined for an extra-threshold correction amount that corresponds to an amount exceeding the threshold in the reference correction amount, and
   the hardware processor further determines the second correction amount according to the intra-threshold correction amount and a planned number of calculations of the reference correction amount in a period from formation of the correction patch until the image forming condition is corrected, and determines a value obtained by subtracting a previous extra-threshold correction amount from a current extra-threshold correction amount as the third correction amount.

6. The image forming apparatus according to claim 5, wherein
   the image forming apparatus is switchable from an image forming mode to an unevenness measurement mode for measuring density unevenness of the correction patch, and
   the hardware processor further sets the threshold on the basis of a measurement value obtained from the measurer in the unevenness measurement mode.

7. The image forming apparatus according to claim 1, wherein
   the image former forms a plurality of target-value calculation patches in an initial stage of continuous printing,
   the measurer measures a density of each of the target-value calculation patches, and the hardware processor further sets a representative value of the densities of the plurality of target-value calculation patches as the target value.

8. The image forming apparatus according to claim 7, wherein the target-value calculation patch has a size greater than a size of the correction patch.

9. The image forming apparatus according to claim 2, wherein the hardware processor further adjusts the first correction amount determined by the hardware processor according to a change in a factor that affects a color.

10. The image forming apparatus according to claim 9, wherein the factor includes an image coverage.

11. The image forming apparatus according to claim 9, further comprising a developing device, wherein
the factor includes a charged amount of toner in the developing device.

12. The image forming apparatus according to claim 9, wherein the factor includes a standby time from an end of previous printing to a start of current printing.

13. The image forming apparatus according to claim 9, wherein the factor includes a temperature in the image forming apparatus.

14. The image forming apparatus according to claim 9, wherein the factor includes a humidity in the image forming apparatus.

15. A non-transitory recording medium storing a computer readable control program causing a computer to perform:
forming a correction patch using toner;
measuring a color, a density, or a deposited amount of toner of the correction patch;
calculating a reference correction amount on the basis of a measurement value so that the density of the correction patch reaches a target value; and
correcting an image forming condition for image formation by a first correction amount smaller than the reference correction amount.

* * * * *